(12) United States Patent
Barrus

(10) Patent No.: US 6,975,334 B1
(45) Date of Patent: Dec. 13, 2005

(54) METHOD AND APPARATUS FOR SIMULATING THE APPEARANCE OF PAVING STONE ON AN EXISTING DRIVEWAY

(75) Inventor: John W. Barrus, Menlo Park, CA (US)

(73) Assignee: Systems Paving, Newport Beach, CA (US)

( * ) Notice: Subject to any disclaimer, the term of this patent is extended or adjusted under 35 U.S.C. 154(b) by 146 days.

(21) Appl. No.: 10/402,284

(22) Filed: Mar. 27, 2003

(51) Int. Cl.[7] .............................. G09G 5/00; G09K 9/34
(52) U.S. Cl. ........................ 345/632; 345/582; 382/173
(58) Field of Search ................................. 345/633, 581, 345/582, 632, 420; 382/173, 175

(56) References Cited

U.S. PATENT DOCUMENTS

| | | | | |
|---|---|---|---|---|
| 5,471,535 A | * | 11/1995 | Ikezawa et al. ............. 382/199 |
| 5,625,765 A | * | 4/1997 | Ellenby et al. ............. 345/633 |
| 6,580,424 B1 | * | 6/2003 | Krumm ....................... 345/419 |
| 2002/0048402 A1 | * | 4/2002 | Braspenning et al. ....... 382/173 |
| 2002/0154132 A1 | * | 10/2002 | Dumesny et al. ........... 345/582 |
| 2004/0128102 A1 | * | 7/2004 | Petty et al. .................. 702/150 |

* cited by examiner

Primary Examiner—Kee M. Tung
Assistant Examiner—Aaron M. Richer
(74) Attorney, Agent, or Firm—Fenwick & West LLP

(57) ABSTRACT

Using a digital camera, special markers, and a computer system, an image is taken of an existing surface that is usually a driveway or a walkway. The boundary of the surface to be modified is manually or automatically selected and the markers are also either manually or automatically selected. The user selects a simulation material and, using the boundary and marker geometry, a new surface is calculated to cover the original surface in the image to give the old surface the appearance of being made of the new chosen material.

26 Claims, 26 Drawing Sheets

(2 of 26 Drawing Sheet(s) Filed in Color)

METHOD AND APPARATUS FOR SIMULATING THE APPEARANCE OF PAVING STONE ON AN EXISTING DRIVEWAY

BACKGROUND OF THE INVENTION

1. Field of the Invention

This invention relates to the simplification and automation of a simulation task where the geometric properties of a surface in an image are calculated so that the material properties of a surface can be changed to give the illusion that the surface is made of a different substance. The invention relates more particularly to systems and methods for creating simulations of new paving stone surfaces in images of existing driveways or walkways.

2. Description of the Related Art

As can be seen by observing special effects in modern movies, it is possible to modify an image and add things that are not in the original image. These techniques can be used to the advantage of construction contractors whose business is to repave driveways and walkways with paving stone. Using sophisticated techniques for simulating materials and lighting, it is possible to show a homeowner how their driveway would look if it were paved with one of many types of paving stone instead of asphalt.

There are many graphics professionals and artists with the skills and tools that allow them to alter a picture of a driveway and create a simulated paved driveway for a specific home. However, in general it is too laborious and time-consuming and therefore too expensive to do this in practice for more than a few homes. Further, the amount of human interaction required and the knowledge about the capabilities of tools prevents it from being done quickly. Not many homeowners would spend the money to hire a professional artist to simulate the look of paving stone on his or her walkway in order to decide whether or not to install stone, and what type to install.

Thus, there is a need for a system and method for capturing images of driveways and modifying them to illustrate different types of surface paving that can be done quickly and at low cost.

SUMMARY OF THE INVENTION

The present invention described below is directed to a system and method that simulates a surface of a driveway in a few minutes. The present invention is particularly advantageous because it can operate on a conventional laptop computer and is simple to operate. The present invention eliminates the need for special skills of artists, programmers and graphic designers to create an image of a driveway or other surface with different texturing and colors. Salespeople or contractors can use the invention to simulate changes in a driveway and allow them to study different shapes and colors of stones and how they would look on a driveway. This benefits the homeowner and the installer of the stones by reducing the need to rely on the imagination of the homeowner when making an important decision, the results of which will endure for a significant length of time.

In accordance with the teachings of the present invention, in one embodiment, markers are laid upon a surface such as a driveway or walkway. These markers are of a known size and shape and have the property of being visually distinct when positioned on top of the surface of the driveway. For example, the markers might be two 1-meter dowels wrapped in reflective tape and fastened at right angles to one another, or they might be flat, elliptical shaped markers with special high-contrast markings. These markers are placed on the driveway in locations that are visible for a digital camera that will be used to photograph the existing driveway or walkway.

With the markers placed, an image of the existing walkway or driveway is captured using the digital camera. This image is loaded into a computer capable of calculating the geometry of the driveway and simulating a surface made of a new material to replace the existing driveway surface in the image.

In order to calculate the position and lighting of the new surface, the geometry and shape of the existing surface is calculated. After the image is loaded, the user initiates a process of finding the boundary of the existing driveway surface. In another embodiment, the detection of the boundary is at least partially automated using computer vision techniques where a tool is provided to the user which looks for certain colors or textures in the image which match a typical driveway surface like asphalt. Alternatively, the person using the apparatus of the present invention uses drawing tools to outline the boundary of the area that will be replaced with paving stones. This boundary indicates the area in the image, which will be redrawn with simulated paving stones. The boundary is preferably a closed set of connected line segments or curves.

There are several parts to a driveway or walkway that is paved with stone. The entire paved area will be referred to as a "driveway", "walkway" or "surface area." Around the edge of the driveway or paved area is typically a "border" of paving stones. This border is usually made of rectangular paving stones laid side to side around the edge. The border surrounds the entire driveway. The interior, or non-border area of the driveway is called the "field".

Typically, when a driveway is photographed, only part of the driveway can be seen in the image. Within the image, a series of connected line segments can be drawn around the area of the image that makes up the visible part of the driveway. This series of line segments is called the "boundary" of the driveway in the image. If, in the unusual case the entire surface of the driveway is shown in an image, the "boundary" if the driveway would correspond exactly to the "border" of the driveway. However, when the boundary of the driveway is along the edge of the image, the boundary does not correspond to the border, because the driveway extends beyond the edge of the image and was not captured completely in the photograph. The "border" lines in the image are then just a subset of the boundary lines. Occasionally, driveway surfaces rise and fall over irregularities in the landscape and so the boundary of a driveway might exist between the surface and a horizon line and this also will not be selected as a border line.

The part of the field that is visible in the image is sometimes referred herein as the "field" even though it comprises only a portion of the entire driveway field. It will be understood when it is used in the context of the driveway image that it is referring to the visible field and not the entire physical driveway field.

Once the boundary is selected and the border lines indicated, the user of the system selects the outlines of objects, which were physically on top of the driveway surface when the picture was taken. For instance, if a car or garbage can was on the driveway, it should not be covered by the new simulated surface. The preferred method of removing objects is to select their boundaries and indicate to the system that the object should be redrawn on top of the simulated surface as soon as the simulation is finished. The system retains the pixels contained in this new boundary instead of replacing them by the simulated surface since are closer to the camera than the surface.

At this point in the process, the markers that were placed on the driveway are located in the image. Again, this is done using well-understood computer-vision object recognition techniques, or alternatively the user of the application can manually locate the markers using a selection tool. The markers provide at least two types of information to the application. Marker size in the image indicates distance from the camera so that markers farther away from the camera appear smaller due to perspective foreshortening. The direction of the marker legs or, in the case of elliptical markers the direction of the major and minor axes of the markers, indicates preferred perpendicular directions for the paving stone layout. In other words, if the paving stones are rectangular or form a rectangular pattern, the perpendicular direction of the markers will indicate the direction that the rectangular pattern should be initially laid out for the simulated surface. The direction and size of the markers allow the system to define a uniform size grid upon which the simulated surface will be built. Of course, the grid doesn't appear like it is of uniform size in the image due to perspective and surface curvature, but if the driveway were to be laid out flat in the image, the grid would be of uniform size.

Using the marker size and direction information, the system now calculates a uniformly spaced grid for the driveway on which to layout the simulated paving stones. In brief, this is done by calculating the grid spacing at each marker based on the marker size and directions, and then smoothly varying that grid spacing by interpolating in between markers and extrapolating towards the edges of the driveway. When the uniformly spaced grid is complete, it can be drawn on top of the existing surface. Each section of the grid looks like a trapezoid or other four-sided polygon in the image. It is possible to use this grid to transform the driveway from how it looks in the image to how it would look in a plan view or overhead view of the driveway. It is convenient to use the plan view for calculating the border geometry instead of the image view because the border is of uniform width and it is easier to calculate the shape of the border in the plan view compared to a perspective view.

Each grid section in the image or perspective view corresponds to a single grid section in the plan view. A 3×3 perspective transformation matrix and its inverse can be calculated for each grid section, and they allow a transformation between the perspective view and plan view. Such perspective transformations have the property that lines, which are straight in one view, are straight in the other view as well. The original driveway boundary can be divided up into line segments, which do not cross grid lines in the original image and those segments can be transformed using the transformation matrices so that the driveway boundary appears, as it should in the plan or flat view.

The plan view driveway boundary lines can now be used to build offset lines, which define the border shape in the plan view. Using well-known techniques for offsetting lines the interior border shape is built and the ends of the borders capped. The new polygons that make up the border shape are divided so that they don't cross grid boundaries and the newly divided polygons can be transformed back into the perspective or image view. Before their transformation however, texture mapping coordinates are calculated for each of the border polygons and those are kept with the polygons when they are transformed back into the image view.

After the grid and border polygons are calculated, it is possible to draw the simulated paving stones on top of the original image. However, a more realistic simulation takes the lighting of the scene into account. What is known about the grid and border are used to approximate the shape of the driveway. The most important piece of information for the lighting is the surface normal which indicates the relationship of the surface to a light source. The grid shape can be used to calculate the surface normal at each grid point and those normals are used to calculate the effect of the light on the driveway. It is important to show some realistic change in the surface lighting due to surface geometry variations and this adds to the realism of the simulation.

Next, the new simulated surface is drawn on top of the original image. After the simulated paving surface is drawn, objects that were selected in the original image as being on top of the driveway can be drawn or rendered back on top of the new simulated surface.

There are almost always shadows in any scene. For instance, a tree or bush by the edge of the driveway casts a shadow on the surface of the driveway. Those shadows do not exist on the new simulated surface. A "paintbrush" tool can be provided to the user of the simulation to allow her to paint shadows on top of the new surface. Shadows can be made to appear by creating a semitransparent overlay image that is painted with black or dark gray on a transparent background. The user paints the areas where shadows should appear and the painted lines of varying thickness slightly darken the area where shadows should appear. In practice, this only adds slightly to the realism of the simulated image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

While the present invention will now be described in the specific context of a system and method for simulating the appearance of a driveway, it should be understood that the methods and systems of the present invention can be used to simulate any variety of surfaces. For example, instead of simulating the appearance of a driveway with different paving stones, the system can also be used to simulate other surface types such as asphalt, concrete, gravel, etc. Even more broadly, the systems and methods for simulating according to the present invention are also applicable to various other surfaces or construction items such a roofs, walls, windows and doors. In such other applications, the present invention could be used to simulate an image of any portion of a building structure with different surface types that offer different appearances.

Figure 1:
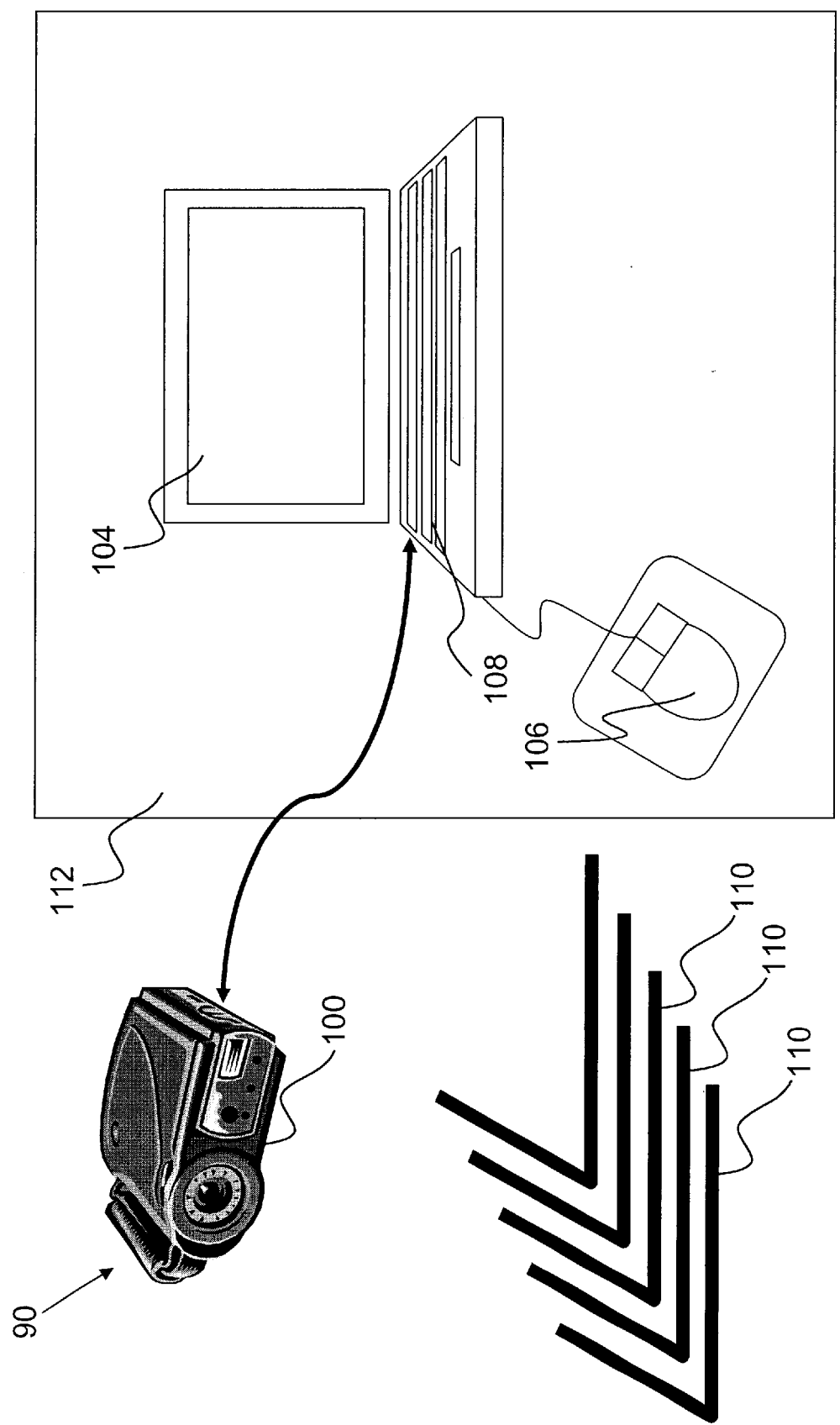
FIG. 1 is a diagrammatic illustration of the system of the subject invention, including a camera or scanning device, a set of markers, a computer with processor, memory, keyboard, and pointing device.

Referring now to FIG. 1, the system 90 of the present invention is shown, including an image capture device 100 such as a digital camera or scanner, a set of markers 110; and a computer 112 having at least a processor, a display 104, a keyboard 108, and a pointing device 106. The image capture device 100 is any image capture device and a digital camera is the preferred embodiment, but it is also possible to capture an image using other types of scanners, including a slide or photo scanner that captures an image from traditional photographic prints, slides or negatives. As long as the output of the image capture device 100 is a digital image of the scene to be simulated, any scanning or capture device is acceptable.

The computer 112, including the processor 102 (See FIG. 2), display 104, keyboard 108, and pointing device 106, can be any type of desktop or laptop computer so equipped. Dell Computer Corporation of Round Rock, Tex., USA, or Hewlett Packard Corporation of Palo Alto, Calif., USA, and many other companies offer such exemplary systems for sale. For example, the Dell Inspiron 5100 laptop includes a processor, a 14.1-inch liquid crystal display, keyboard, touchpad pointing device, plus a port for alternatively plugging in a mouse or pen-based tablet.

In addition to the image capture device 100 and the computer 112, it is necessary to have a special set of markers 110 to put on the surface to be simulated. FIG. 1 shows a schematic diagram of markers 110 made of a pair of dowels which are a known length—one meter each in the preferred embodiment—with reflective tape or painted in such a way that they have high contrast to the surface on which they are placed. High contrast makes it easier for either the computer vision software or the users of the application to locate the markers 110 on the surface. One way to guarantee that the markers 110 are high contrast is, after connected the dowels together, paint them white on one side and black on the other side so that the dark side can be used on light surfaces like concrete and the white side on dark surfaces like asphalt. The dowels are preferably attached at a 90-degree angle to one another.

The dowels used to build the markers 110 are preferably scaled for the surfaces to be simulated. If you are simulating driveways, 1-meter length is appropriate, but if you are doing smaller surfaces, smaller markers could be used. It's important that many markers be can be placed on the surface, therefore the size should be appropriate to the size of the surface being simulated.

An alternative to the right-angle dowel-based markers 110 is painted, flat elliptical markers (not shown). Ellipses have a major and minor axis of known length and it is possible to determine their orientation in an image using well-known computer vision methods. Painting the ellipses contrasting colors, for instance target patterns or alternating black and white on each side, makes it easier to locate the ellipses in the digital image. Any shape or type of marker will work as long as the size is known and perpendicular directions can be determined using the markers.

Figure 2A:
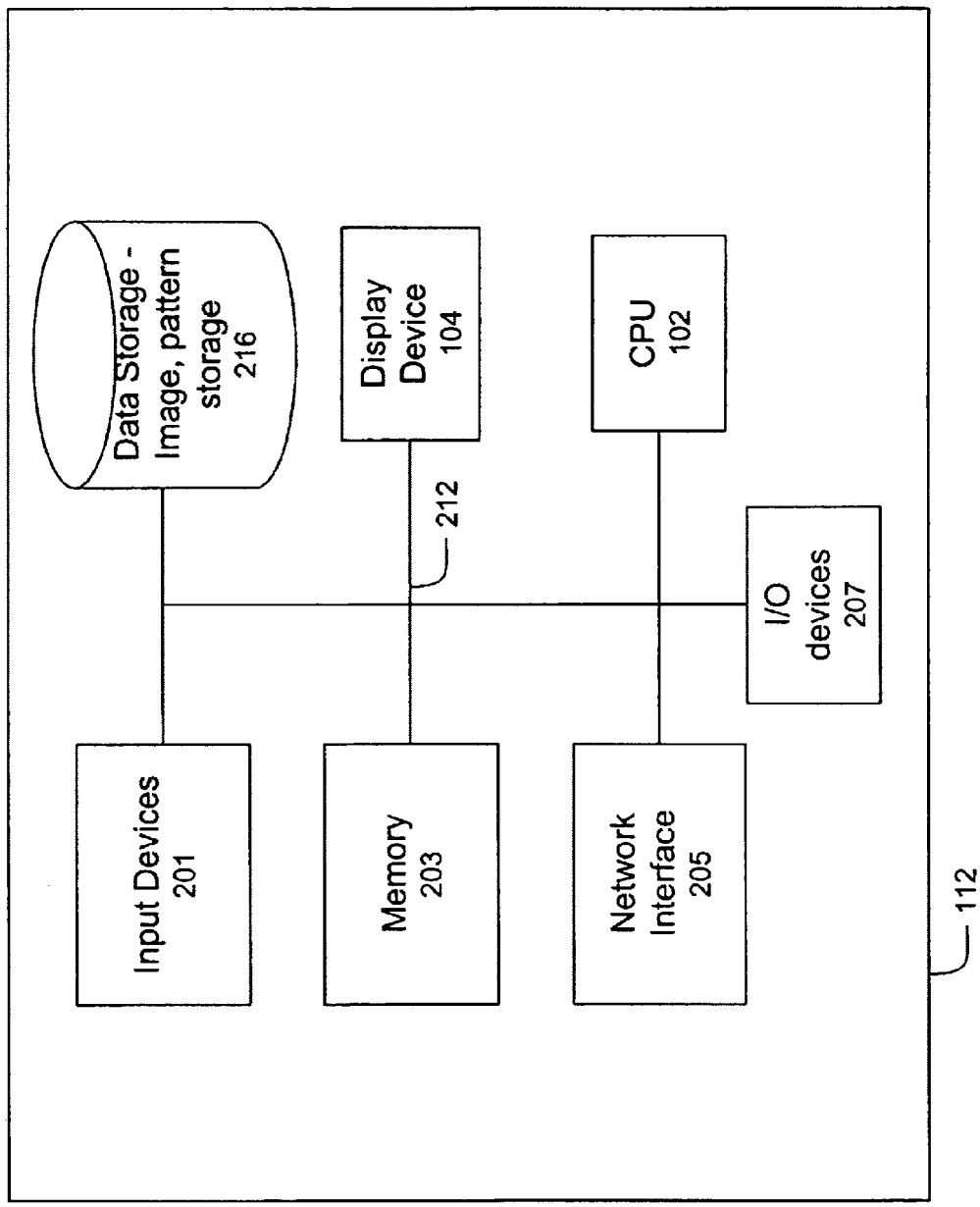
FIG. 2A is a block diagram of the computer shown in FIG. 1.

FIG. 2A shows a block diagram of the components of the computer 112, coupled in a conventional manner by a bus 212, and including the processor 102, a display 104, input devices 201 including the keyboard 108 and mouse 106, a data storage 216 which includes storage of the image and simulation patterns or textures, a network interface 205, and a memory 203 in which the programs are stored and where intermediate states of the simulation are stored during operation. The computer 112 also includes I/O devices 207 besides the network interface 205 which allow the computer 112 to connect directly to the image capture device 100.

Most modern digital cameras and scanners connect to computers through I/O devices 207 like FireWire or Universal Serial Bus, commonly called USB, connections. Almost all modern desktop and laptop computers come with USB ports. FireWire cards or ports are available on almost all desktop computers and some laptop computers and are well known and well understood in the industry.

The display device 104 is used to display the original image, provide intermediate views of the simulation and feedback during selection and identification of boundary and marker locations and other operations and to provide the final view of the simulation after the calculations and drawing are completed. The input devices 201 are used for typical user interface tasks, including selecting the image for simulation, starting the simulation, selecting surface boundaries, locating markers and all other tasks that may require user input.

Data storage 216 is typically non-volatile memory or magnetic media. Images to be simulated can be stored there, as well as paving stone images and border stone images to be used in the simulation. While the network interface 205 is not essential for operation of the present invention, most modern computers include such an interface and the input image to the simulation might come through the network interface 205 instead of directly from the image capture device 100. Moreover, the network interface 205 can couple the system 90 to a printer or other rendering device for reproduction of the simulated image.

Figure 2B:
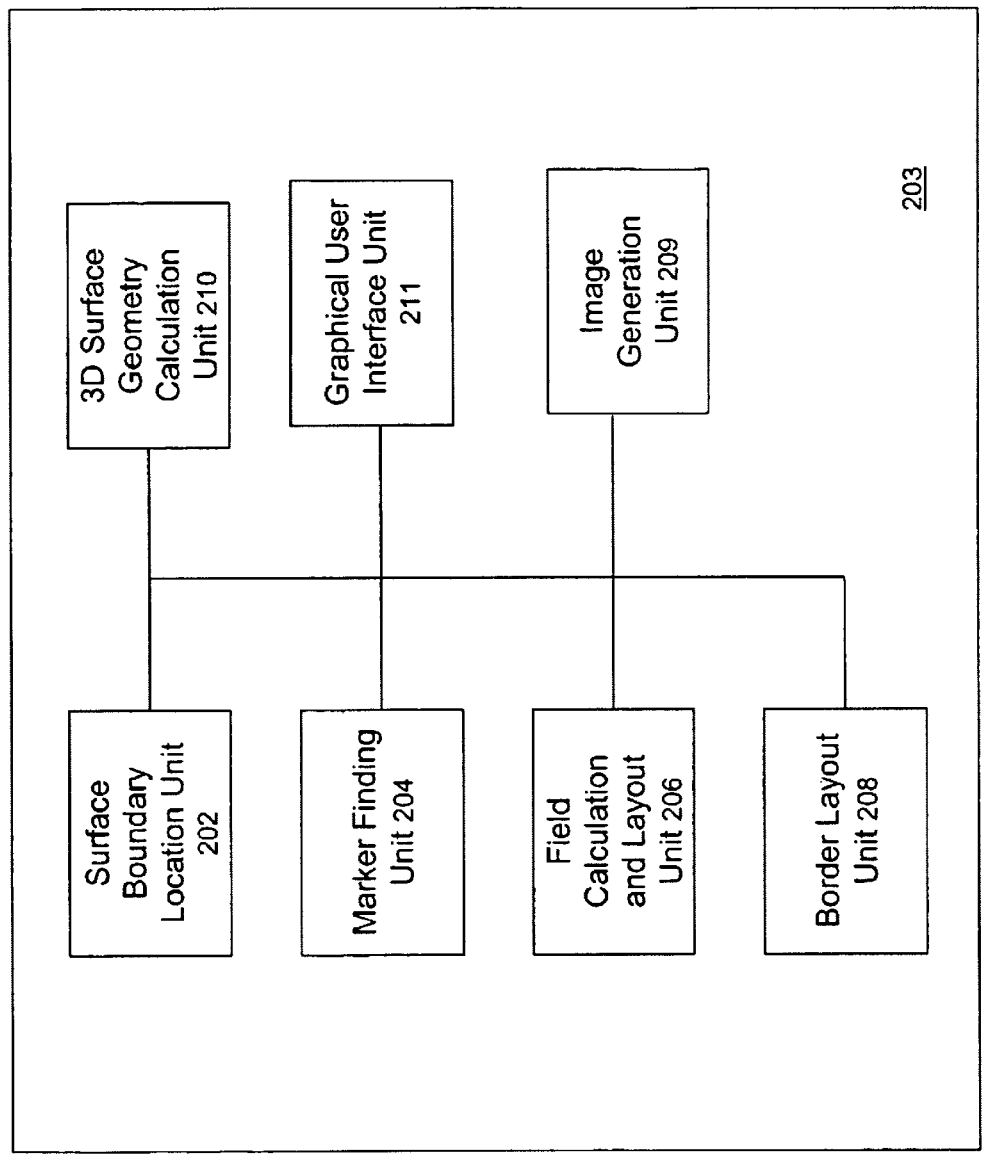
FIG. 2B shows a block diagram of the memory of the computer shown in FIGS. 1 and 2A, respectively.

The processor 102 executes the instructions stored in the various memory units shown in block diagram form in FIG. 2B. It also controls loading and unloading image data from the data storage 216, as it is needed.

FIG. 2B shows the details of the memory 203 including the different units responsible for acting on different parts of the image and carrying out various methods of the invention. While these are shown as separate units of memory, those skilled in the art will recognize that that may be separate programs, routines or modules of software.

The Surface Boundary Location Unit 202 is responsible for either automatically detecting the boundary of the surface to be simulated or interacting with the Graphical User Interface or GUI Unit 211 to provide methods for a user of the invention to specify the location of the surface boundary. These user controlled methods are like those familiar to users of drawing programs where the user indicates the endpoints of line segments and the computer displays lines based on those endpoints.

The Marker Finding Unit 204 is provides the instructions for locating the markers 110 in the input image. These instructions might include computer vision methods for locating the markers automatically or might also include instructions for interacting with the Graphical User Interface or GUI Unit 211 that allow the user to click on various parts of the markers 110 in order to tell the computer 112 where the markers 110 are located.

The Field Calculation and Layout Unit 206 includes the instructions for calculating the location of and laying out the field grid based on the surface boundary and marker 110 locations.

The Border Layout Unit 208 provides instructions for taking the output of the Field Calculation and Layout Unit 206 and laying out the border as described below.

The 3D Surface Geometry Calculation Unit 210 provides the instructions for calculating a full three-dimensional representation of the surface to be simulated to provide the image generation unit 209 with information for calculating the lighting effects. Specifically, this information includes surface normals that control how much light reflects from a simulated a light source to the image capture device 100.

The Graphical User Interface or GUI Unit 211 provides instructions to the processor 102 about how to interact with the user of the system 90—specifically the computer 112. The GUI Unit 211 provides visual information and feedback to the display 104 and accepts input (at least cursor motions and button clicks) which, in conjunction with information displayed on the display 104 indicate operations that should be performed by the processor 102 using the instructions provided in the memory 203. All of this is well understood by those familiar with graphical user interfaces and modern computers and operating systems.

The Image Generation Unit 209 is responsible for providing instructions to the processor 102 for doing many types image operations, including calculating pixel colors due to the combination of materials and lighting, compositing transparent images with the original image, displaying the original image, displaying menus and notifications to the user to indicate errors or how to use the system 90 of the invention. The image calculated by the processor 102 in conjunction with the Image Generation Unit 209 is displayed on the display 104.

Figure 3:
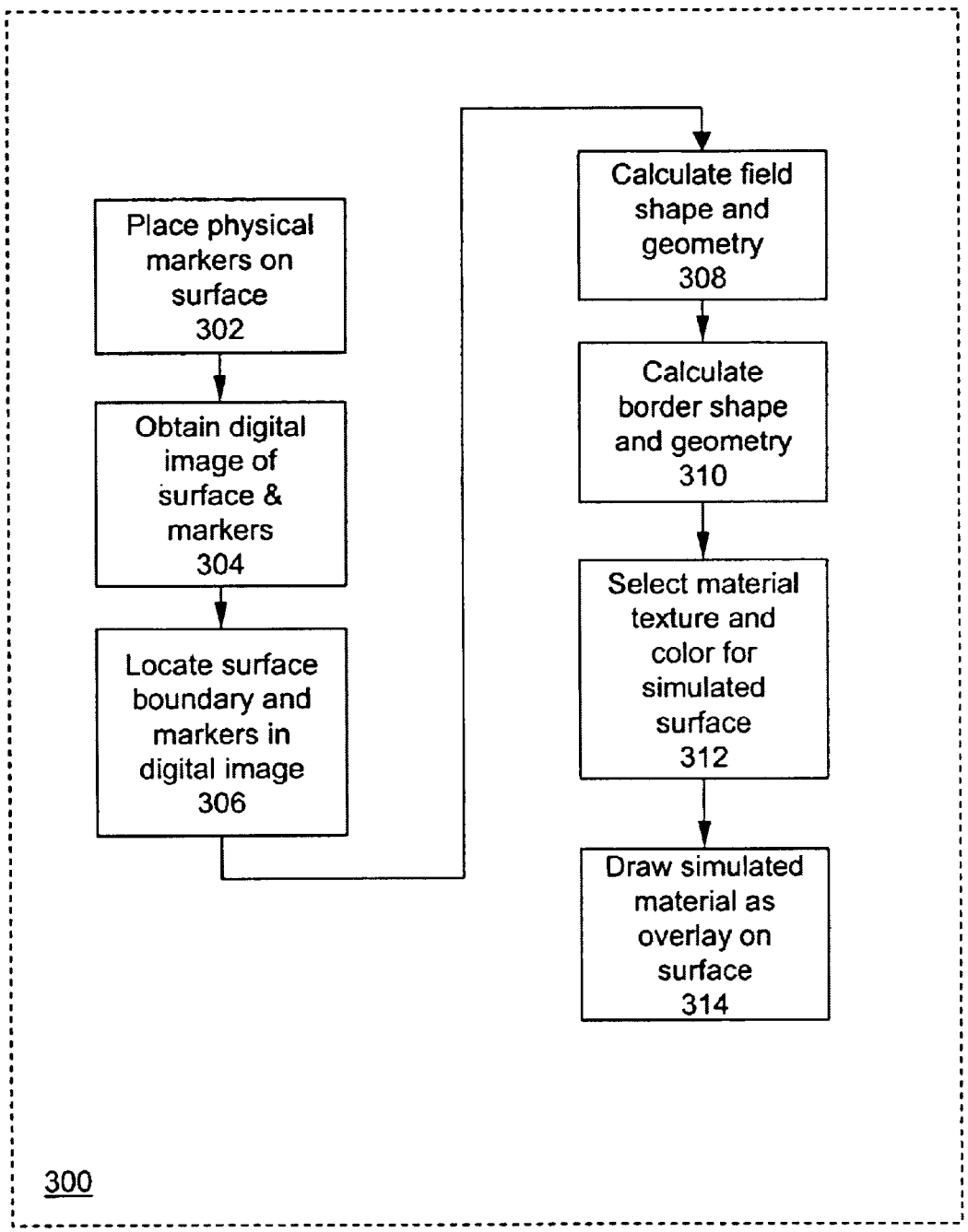
FIG. 3 is a flow chart showing a basic method of simulating a new surface in place of an existing surface in an image.

FIG. 3 is a flow chart for a preferred method 300 for simulating a paved surface according to an exemplary embodiment of the present invention. The first step of the invention is to place 302 a plurality of markers 110 on the surface that is to be replaced with a simulated surface. Typically, this surface will be a driveway or walkway and there are enough markers to allow the Field Calculation and Layout Unit 206 to calculate a reasonable approximation to the layout of the surface.

Figure 10:
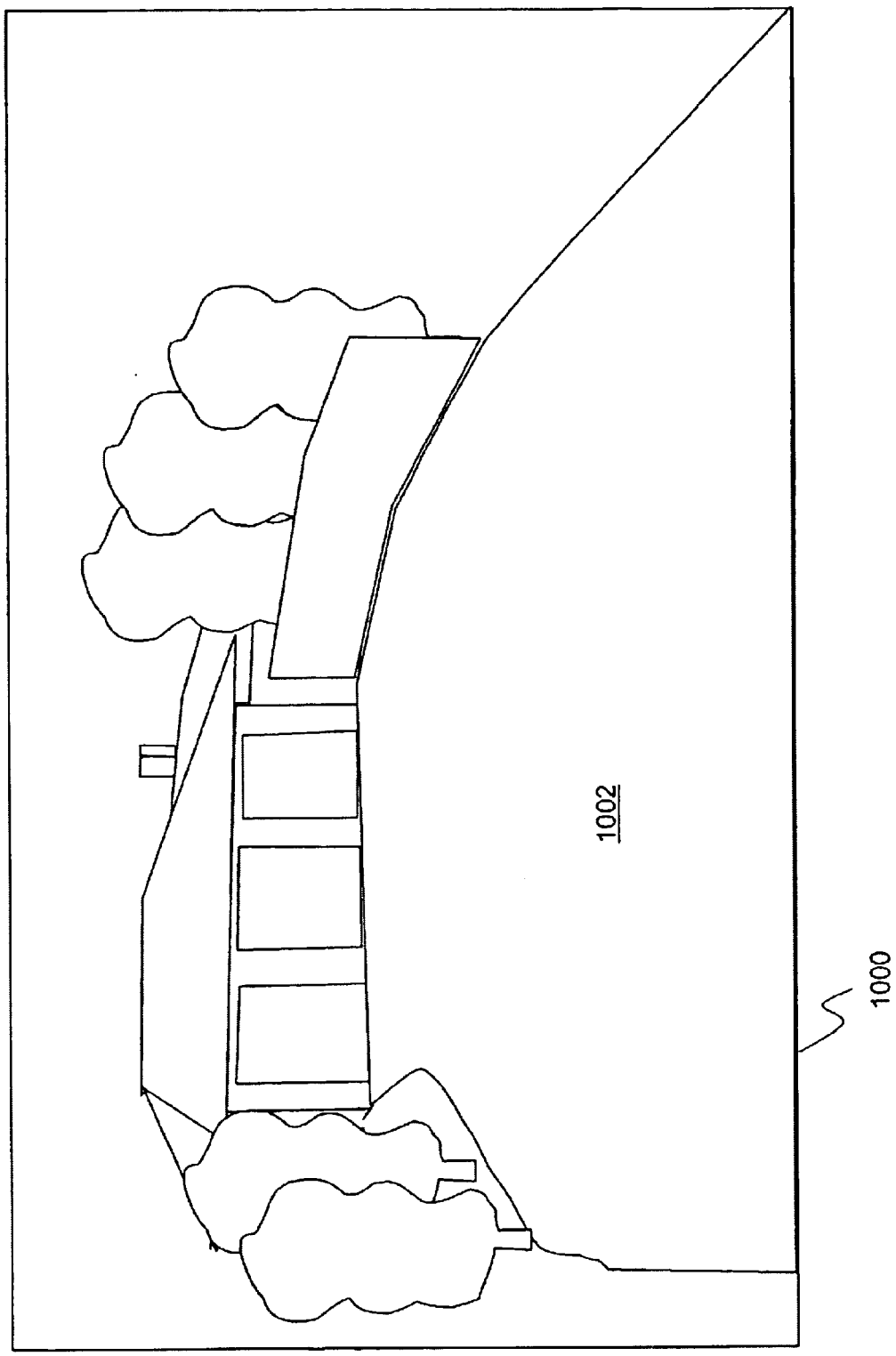
FIG. 10 is a diagrammatic illustration of the original driveway image before the simulation of this invention.
Figure 11:
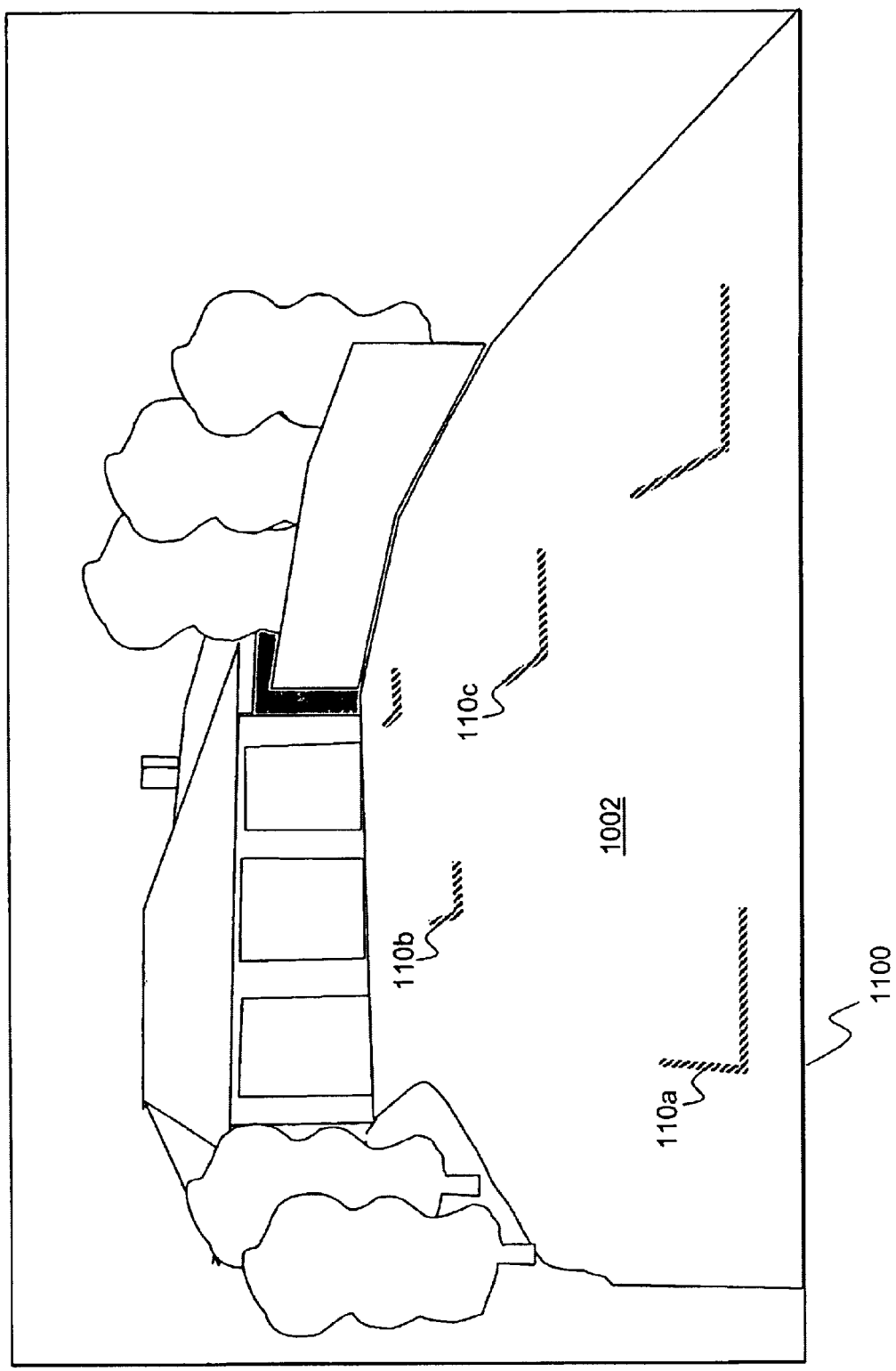
FIG. 11 is a diagrammatic illustration of the original driveway image where markers have been laid out on the surface of the existing driveway.

Referring now also to FIG. 10, it shows a diagrammatic representation of an image 1000 of a driveway that might be used in this invention. The driveway surface 1002 in this example is of asphalt. FIG. 11 shows a representation of an image 1100 of the driveway surface 1003 with markers 110a, 110b and 110c placed on the driveway surface 1002. In this case, five markers are placed on the driveway surface 1002.

Preferably, 5 or more markers 110 are placed on a driveway surface 1002 to be simulated. This is because the markers 110 indicate the three-dimensional position and orientation of the driveway surface 1002. A single marker 110 would only give driveway surface 1002 information at a single point. Although the information from a single marker 110 indicates the direction of the field grid lines at that point, if the direction of the grid lines is unchanged throughout the entire driveway, there will be no perspective foreshortening in the simulated driveway. The simulated driveway will look like an artificial orthogonal view of the paving stones on top of a driveway image.

With two markers 110, there is some additional information about the real surface geometry. Using two markers 110, the present invention interpolates shape between the markers 110 mathematically and fits a flat, three-dimensional surface to the driveway surface 1002 in the image 1000. However, this will generate some perspective foreshortening, the simulated surface will still seem artificially flat. Few real driveways are flat in reality, and this is less than optimum.

With a third marker 110, it is possible to calculate a curved surface which is much more representative of the real driveway and looks much more realistic. However, since most driveways are complex three-dimensional surfaces with many curves, it is usually beneficial to have 5 or more markers to the driveway unless the driveway really is almost perfectly flat. One of the advantages of this invention is that since most of the simulation process is automated and therefore fast, if not enough markers 110 are laid down the first time, it is possible to take another image using more markers 110 and get a better simulation in a matter of minutes.

Referring back to FIG. 3, block 304 is the second step where an image of the surface is captured after the markers 110 are laid down on the surface. The image capture device 100 can be used for this step. FIG. 11 shows a diagrammatic representation of an image 1100 of a driveway with the markers 110 laid on top of it.

Block 306 of FIG. 3 indicates the next step where the image from the image capture device 100 is loaded into the computer 112 and the surface boundary and markers 110 are located in the new image. This process is described in more detail below with reference to FIG. 5.

Figure 12:
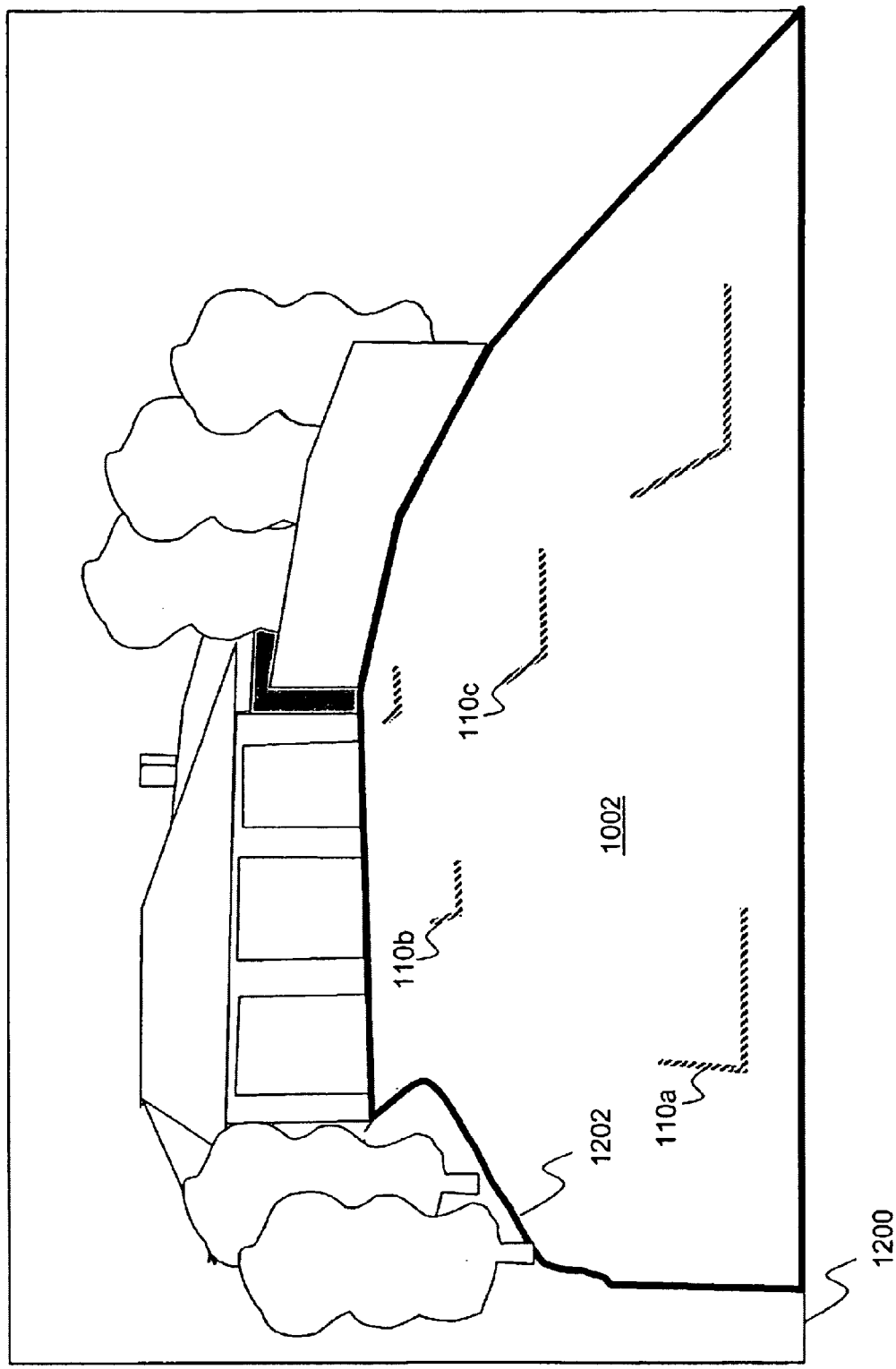
FIG. 12 is a diagrammatic representation of the driveway image looks after a boundary of the driveway has been either calculated or selected by the user of this invention.
Figure 14:
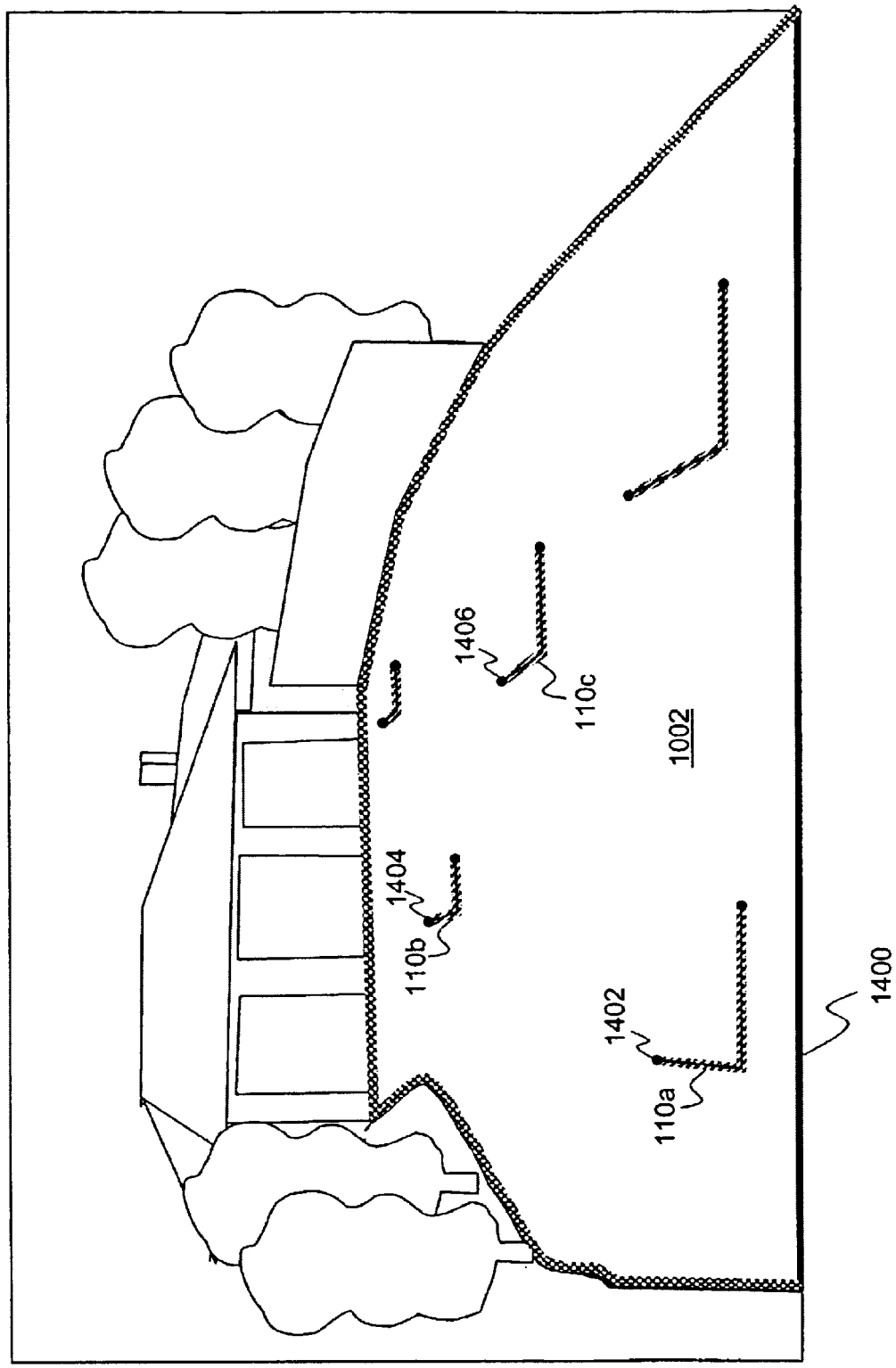
FIG. 14 is a diagrammatic illustration of the driveway image after the markers have been found or selected and they have been highlighted.

FIGS. 12 and 14 are diagrammatic representations of an image 1200, 1400 of a driveway with the surface or driveway boundary 1202 and markers 110 located and indicated.

Figure 5:
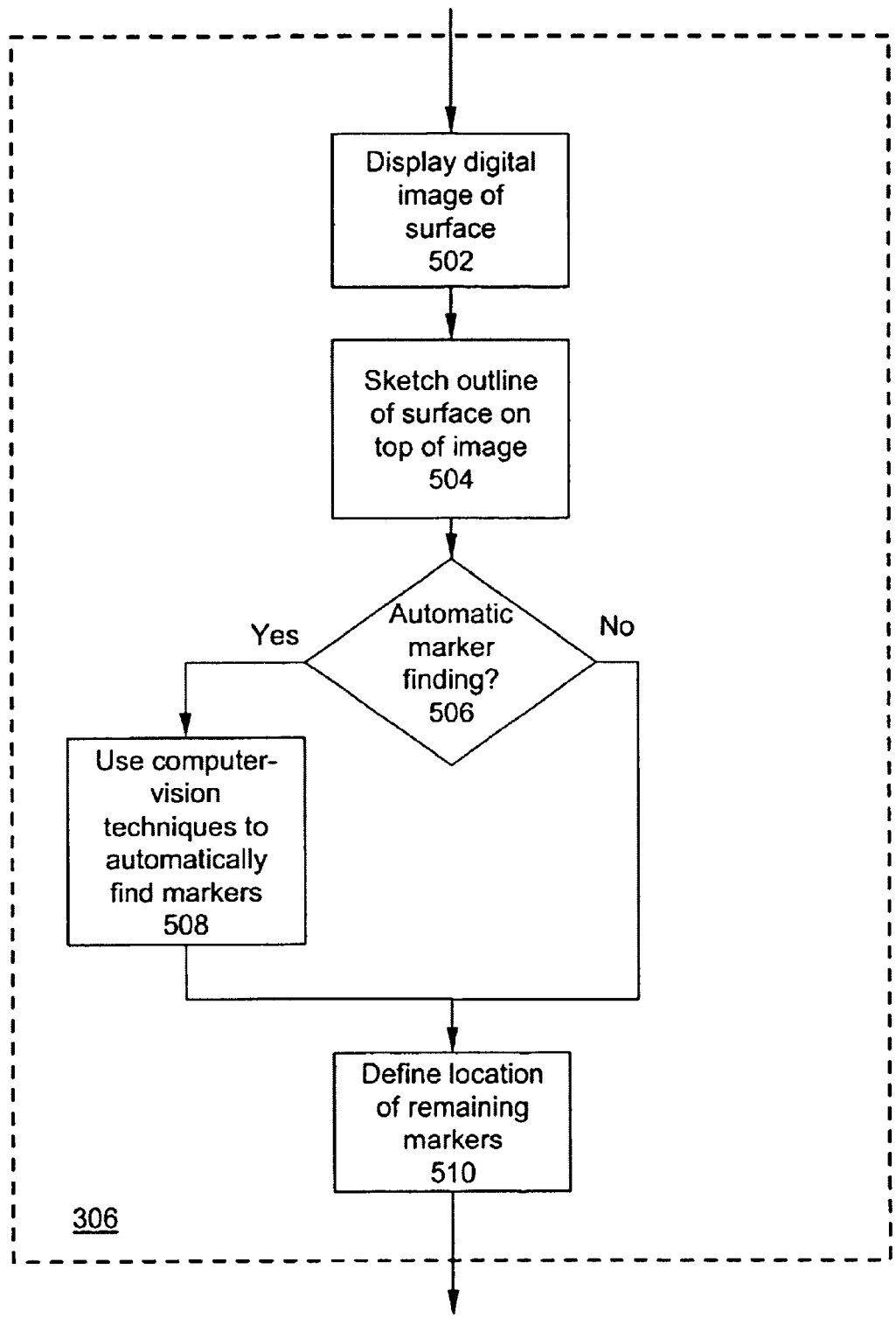
FIG. 5 is a flow chart of the method for locating surface boundary and markers.

FIG. 5 illustrates the operation of block 306 where the driveway boundary 1202 and markers 110 are located either automatically or by the user. In block 502, the image captured using the image capture device 100 is displayed to the user on display device 104.

In block 504, the user manipulates the pointing device 106 or other input device 201 to use a tool that allows her to draw a boundary 1202 of the surface to be simulated on top of the image. In the case of a driveway, this means that the user clicks with a mouse pointer 106 around the perimeter of the visible part of the driveway while the GUI 211 indicates the area being selected by displaying line segments in a visually distinct manner connecting the indicated points. This is similar to the polygon selection tool available in Adobe Corporation's PhotoShop application and is known in the art. When the line segments form a closed region, the initial selection process is finished.

It is useful also to provide an editing mode where the selection can be modified by selecting and moving the points that control the selection. This type of technique is similar to the "edit points" menu choice in Microsoft Corporations PowerPoint software where after a polygonal object is created, you can modify the shape of the object by moving individual points. Again, this technique is known in the art.

The polygon drawn during the selection process outlined above is the polygon that will be replaced in the final simulation. FIG. 12 shows an example driveway image 1200 with the driveway boundary or polygon 1202 selected.

Nothing in the simulation requires the polygon to remain invariant during the rest of the process and it is entirely possible to return to edit the selection polygon at the end of the simulation and modify its shape in order to display the simulated surface on a slightly different part of the original image.

The system 90 next determines 506 whether or not to use automated marker discovery. This decision can be put to the user of the system 90 if so desired. Otherwise, the system 90 proceeds with automated marker finding before moving to block 510. If block 508 is reached, the system 90 uses known computer vision techniques like the Hough Transform to determine the location of the markers 110 on the original image. Line and shape finding techniques and algorithms like the Hough Transform are known in the art. For example, the present invention may employ techniques disclosed in *Shape Detection in Computer Vision using the Hough Transform* by V. F. Leavers published by Springer Verlag or in *Computer Vision: A Modern Approach* written by David Forsyth and Jean Ponce and published by Prentice Hall in 2002. Those skilled in the art will recognize that these methods for detecting specific shapes and lines in an image or other similar methods may be used for step 508.

One advantage of looking for the markers 110 after selecting the driveway boundary 1202 in block 504 is that the computer vision techniques can look for markers 110 only on the area where markers 110 might be found, ignoring areas outside the boundary. This improves the chance of finding all the markers 110 and only the real markers. Asphalt or other surfaces which are of fairly uniform appearance usually don't have details which look like markers 110 so when the search is constrained to the surface, false positives are less likely to occur and real markers 110 are not likely to be hidden by the surface appearance.

Not all automatic feature and shape finding algorithms are perfect and depending on the image, some image features might be appear to be markers 110 and some real markers 110 may be missed—perhaps due to shadows in the image or the small size of a distant marker. In any case, after the automatic marker finding algorithms find some or all of the markers 110, in block 510 it is possible to ask the user to verify the location of the markers 110, either finding ones that the computer vision techniques missed, or adjusting those which are found which are not entirely accurate, or deleting spurious "markers" found by the computer vision techniques which were really just features in the image. FIG. 14 shows a diagrammatic representation of a driveway image 1400 with the markers 110*a*, 110*b* and 110*c* selected and their location 1402, 1404 and 1406 indicated in the image 1400.

Block 308 of FIG. 3 indicates that the next step is to calculate the field shape and geometry based on the location of the surface boundary 1202 and markers 110.

Figure 6:
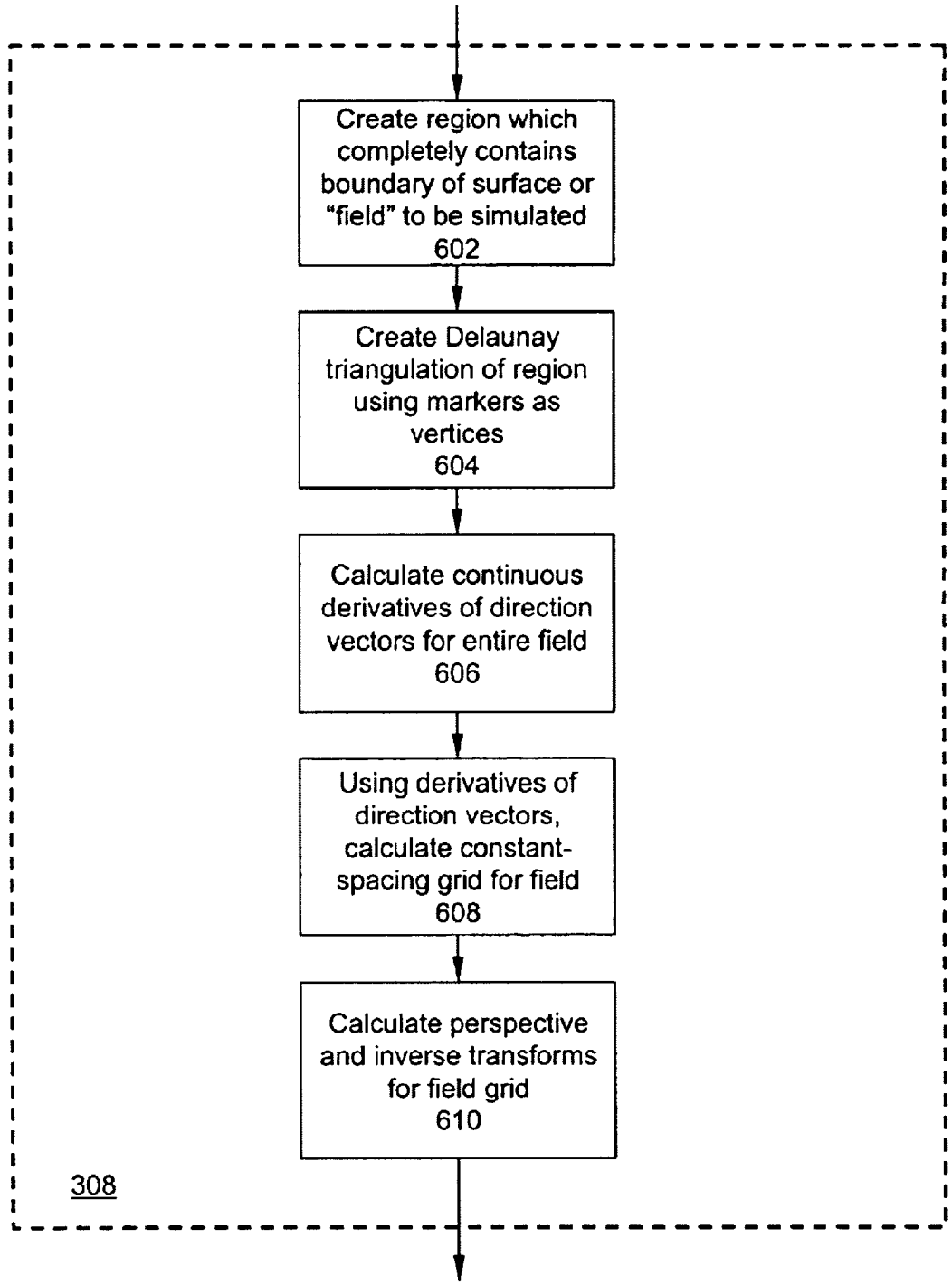
FIG. 6 is a flow chart of the method for calculating the transformations for the grid.
Figure 15:
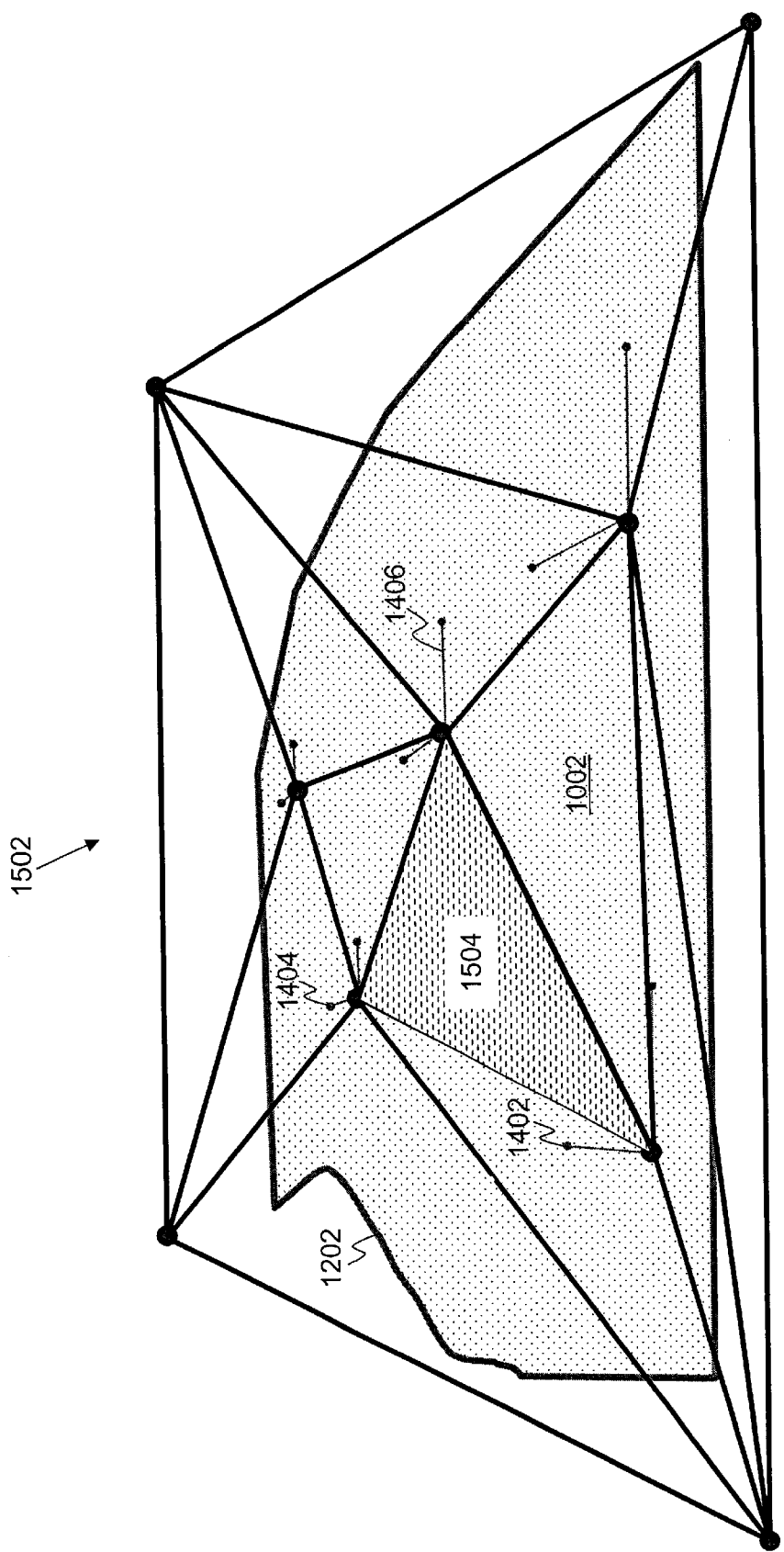
FIG. 15 is a diagrammatic representation of the region of an image that represents the old driveway surface with an enclosing region that has been divided up into a Delaunay triangulation using the marker knee points as vertices.
Figure 16:
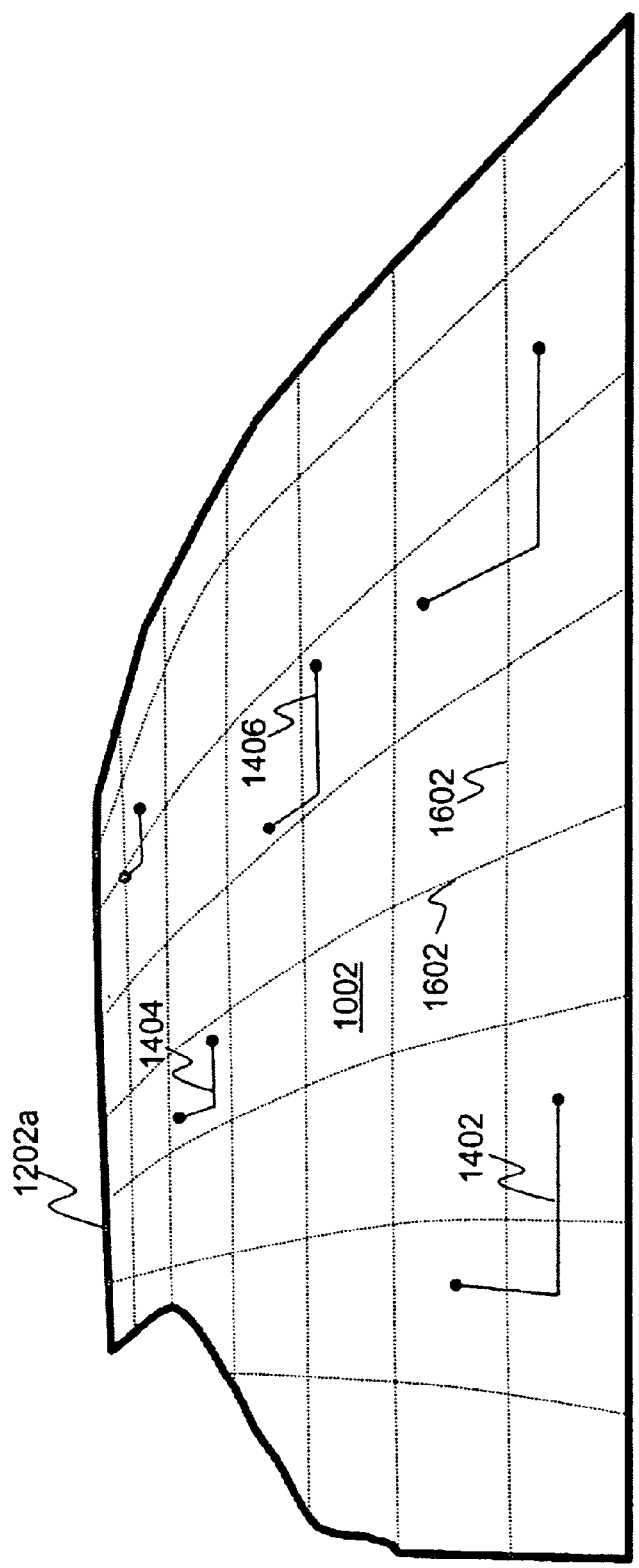
FIG. 16 is a diagrammatic illustration of the driveway region after it has been divided up into grid sections based on the marker sizes.

A flow diagram of the details of block 308 is shown in FIG. 6. FIGS. 15 and 16 are also helpful in understanding the calculations done in block 308.

In block 602 in FIG. 6, a region 1502 is created which completely contains the driveway boundary 1202 outlined in block 504. The region 1502 shown in FIG. 15 is typically a polygonal shape. The primary requirement when constructing region 1502 is that it must completely enclose the driveway boundary 1202. One way to construct a polygon that completely contains a region is to find the geometric center point of the region, calculate the distance of each of the boundary points from the center point, and create a circle whose radius is slightly larger than the largest distance from the center point to the points. This circle is guaranteed to contain all of the boundary line segments. Then, create a square, triangle, or other polygonal shape that completely encloses the circle and use this polygon as the region 1502. This is a known technique and is understood in the art. One book with many of these mathematical techniques for dealing with two- and three-dimensional geometry and construction is a book called *Computer Graphics: Principles and Practice* by Foley, van Dam, Feiner, and Hughes and published by Addison-Wesley. The second edition was published in 1990. Also, the Graphics Gems series (Graphics Gems I, II, III, IV, and V) published by Morgan Kaufmann and Academic Press, and compiled and written by various authors, contain many code examples and algorithms that are useful. For instance Gem 1.5 in Graphics Gems IV by Paul Heckbert shows how to find Voronoi diagrams and create Delaunay triangulations—something that is used in block 604.

In block 604, once the new region 1502 is created, a Delaunay triangulation of the new region is created where the vertices of the triangulation include the vertices of the polygons of the region 1502 and the points at the knees of the marker positions 1402, 1404 and 1406. Delaunay triangulation is well understood in the art and one algorithm for constructing the triangulation is available in the Graphics Gems IV book as indicated previously. FIG. 15 shows an example Delaunay triangulation created using region 1502 and markers 1402, 1404, 1406, etc.

The final goal of block 308 is to create a grid that represents the shape of the driveway in three dimensions. The markers 110, 1402, 1404, 1406, etc., give some specific information at specific points in the image 1002. Each marker 1402, 1404, 1406, etc., indicates unit steps in orthogonal directions. In other words, at the knee of a marker, it is possible to calculate how far to move in one of two orthogonal directions in order to move one step. The step size is based on the size of the markers 110. For this example, we will assume that the markers are 1 meter in each direction. This is a good size to choose for driveways, but in general the markers should be sized appropriately for the surface to be simulated.

In other words, if you are standing at a marker and want to move 1 meter in one of the two marker directions, you can move the distance of one of the arms of the marker. The markers 110 in the image 1002 make it possible to determine a transformation from real three-dimensional space to image space. If the computer mouse were moved from one end of the marker arm in the image to the other end, it will have moved 1 meter in one of the orthogonal directions in real space.

In order to complete block 308, the system 90 creates a unit grid 1602 (See FIG. 16) over the interior of the part of the driveway enclosed by the boundary lines 1202. A completed unit grid 1602 is shown in FIG. 16.

It is known how far to move and in which direction to move at each of the markers 1402, 1404 and 1406. Notice that the distance and direction change from marker to marker and indeed over the entire surface 1002 if you look at the finished grid 1602. The direction and distance that should be moved in the image in order to move a unit step in one of the orthogonal directions could be thought of as the derivative of the surface, even though it is not an actual derivative of the three dimensional surface. In this case, using the word derivative indicates that we know the direction and distance to move at certain points even though we don't know the shape of the whole surface.

An example illustrates these principles of the present invention. Imagine a two-dimensional open curve of unknown shape. The curve could be an arc, or a sine wave, or some other shape. The mathematical definition of the parameterized curve is x=f(t) and y=g(t) where f and g are functions defined in t and t is defined between tmin and tmax. Suppose also, that our goal is to learn the shape of the curve. And assume also that we know only the derivative of the curve at select points along the curve, but don't know the actual curve.

We could begin to calculate the shape of the curve from the derivative of the curve. If we don't have the entire derivative that is defined over all of t, we can construct a curve that approximates the derivative of the original curve based on the known derivative points. If the curve were defined by some function x=f(t) and y=g(t) where t varies from tmin to tmax, the derivative is equal to dx/dt=df(t)/dt and dy/dt=dg(t)/dt from tmin to tmax. If we know the value of dx/dt and dy/dt at some values for t, we can approximate the actual derivative by constructing a piecewise linear curve of the derivative from tmin to tmax. Let's assume that we know the derivative at points t1, t2, and t3 where tmin<t1<t2<t3<tmax. For values of t between the known points t1, t2, and t3 we can interpolate between the values of the derivative at that point to approximate our derivative curve. For values between tmin and t1 and between t3 and tmax, we have to extrapolate, and it is reasonable to extrapolate the line based on the second derivative between t1 and t2 out to tmin and the line based on the second derivative between t2 and t3 out to tmax. In simplified terms, the approximate derivative would consist of a straight line between tmin and t2 that passes through t1, and there would also exist a straight line between t2, and tmax passing through t3. This is true of both dx/dt and dy/dt.

Now, in order to draw the actual curve (x=f(t), y=g(t)), we can use our piecewise linear derivative to construct a curve which is c2 continuous—meaning that not only is the curve itself continuous, but the curvature of the curve is continuous also—the definition of a smooth curve.

To construct a curve from its derivative requires integration of the derivative along t. Choosing a delta t or a small change in t, calculate the dx/dt and dy/dt using the piecewise continuous derivative functions. Plot a single point, for example at the origin, which represents the beginning point of the curve. Calculate the derivative at tmin, which gives you dx/dt and dy/dt at tmin. Multiply dx/dt and dy/dt by delta t, which is the step value you've chosen. This gives you a value for dx and dy. Plot the next point at dx, dy which is actually the origin+(dx, dy) but since the origin is (0, 0) equals (dx, dy). Now, move along the derivative curves by another delta t to calculate a new derivative. Again, use the new dx/dt and dy/dt values, multiply them by delta t, and draw the next point of the curve at dx and dy from the previous point of the curve. This method of integration is called Euler's method and is well known and perhaps the most simple integration technique available to mathematicians and engineers. It calculates each point based on the previous point and the derivative at the previous point. This is well known in the art. Another more powerful method is called Runge-Kutta integration where the new point is calculated based on the derivative not just of the previous point but of the derivative at the expected new point and of an intermediate point. This is a very accurate integration method well understood in the art, and is disclosed in Foley's Computer Graphics book specified above.

In this invention, the purpose is to construct a transformation between a two-dimensional image and a three-dimensional scene. Specifically, the method maps the image of a three-dimensional driveway onto a two-dimensional image.

Figure 18:
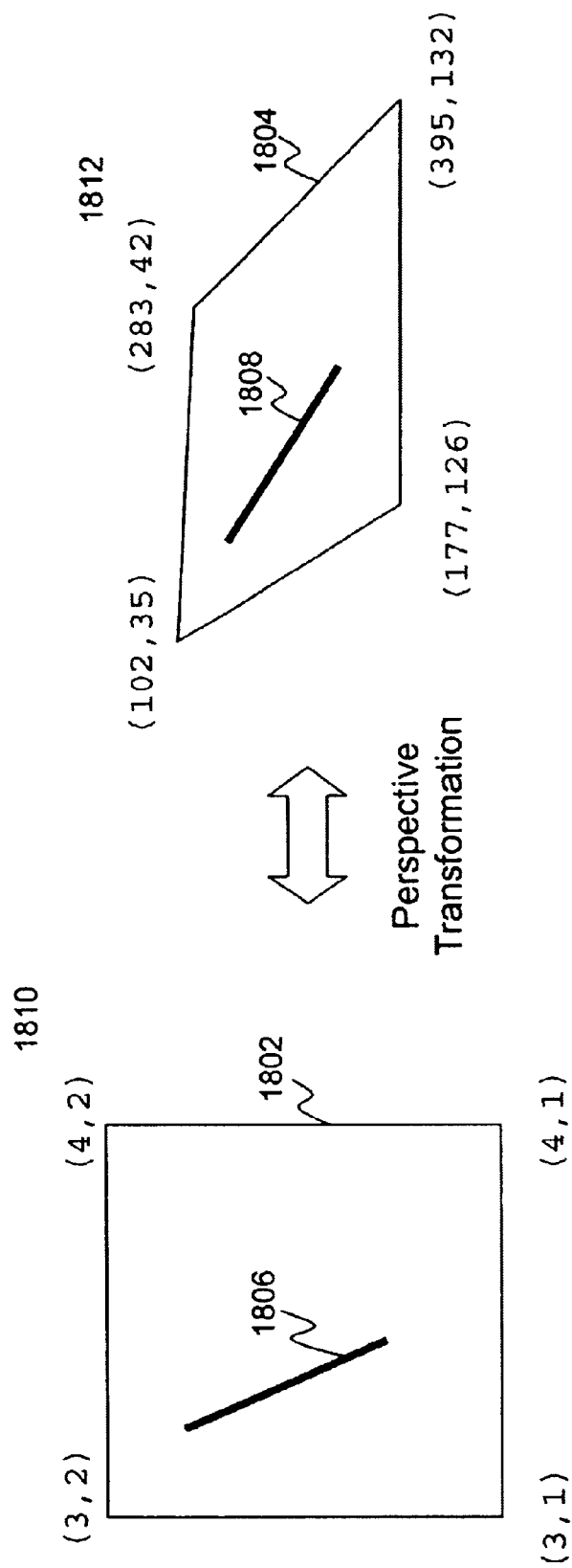
FIG. 18 is a diagrammatic illustration of the transformation between a single grid section and the corresponding image grid section that can be done mathematically using a 3×3 perspective transformation matrix and its inverse.

A given square on the driveway maps to some polygon on the image. In fact, given a non-degenerate, closed 4-sided polygon it is possible to calculate a 3×3 perspective transformation matrix that maps each of the vertices in a 1-unit wide and 1-unit high square to the vertices in the polygon and each of the edges of the square to the corresponding edge in the polygon. This is shown in FIG. 18 where the unit square 1802 has a perspective mapping to the 4-sided polygon 1804. Given a line 1806 in the unit square 1802, the perspective transformation matrix is used to calculate the view of the line 1808 in polygon 1804. The inverse of the matrix could be used to transform line 1808 back to square 1802 to appear as line 1806.

For the present invention, the driveway region 1002 is considered to be made up of unit squares. Each of these squares is a 4-sided polygon in the digital image 1000 of the driveway. In fact, an example of this can be seen in FIG. 16 which shows a representation of a unit square grid 1602 overlaid on the driveway surface 1002 and FIG. 17 which shows a representation of the unit square grid 1602 and the driveway 1702 transformed into the grid space or in other words, flattened out.

An example was given of calculating the shape of an unknown two-dimensional curve based on a few known derivatives. For the driveway, the system 90 calculates a surface, not just a single curve. A single curve could be described as the path of a point swept along to form a curve. Similarly, the driveway surface may be represented by a family of curves starting on one side of the driveway and being swept along to the other side of the driveway. Not just a single point is swept out into a curve, but a family of points or an entire curve could be swept out into a surface. In other words, the two dimensional example given before is extended into four dimensions to calculate the shape of an imaginary unit grid over the surface to be simulated. Another way to look at it is to imagine sweeping along two parameters that are orthogonal to one another. Instead of just sweeping along t from tmin to tmax, we will also sweep along v from vmin to vmax.

One of the immediate insights when we move to two parameters and two dimensions (x=f(t, v), y=g(t,v), x'=f (t, v), y'=g'(t,v)) is that instead of having a linear curve which represents the derivative of the four functions, the derivatives will be represented by a piecewise continuous surface. Starting with a single point somewhere on the image, we would like to calculate the polygon that would represent a square in the flattened image of the driveway 1702. In order to do that, we need to know which direction to move in the image for one direction, and the direction to move that is orthogonal to the other direction. Each marker 110 represents a unit motion in two orthogonal directions so when we are directly on top of the center of a marker, we know exactly which two ways to move to build the polygon. The markers 110 represent the known derivative points.

When we are not on top of a marker, but inside of a triangle defined by the center points of three separate markers, we can interpolate between the three markers to determine which directions we should move to draw a unit square. This is the two-dimensional equivalent to creating a one dimensional piecewise continuous derivative curve as described earlier. In the case of the driveway, we are creating a two-dimensional piecewise continuous surface which represents a continuous derivative surface and allows us to create a smooth simulated surface. In step 606 of the method of the present invention, the system 90 calculates continuous derivatives of direction vectors for the entire surface area.

FIG. 15 shows the driveway outline and a Delaunay triangulation of a region that completely encloses the driveway boundary 1202 in the image. It is this region 1502 over that the system 90 defines the derivatives representing the surface to be simulated. Consider two orthogonal directions on the surface represented by j and k. At any point in the image, to move a unit in the j direction, you will need to move some amount in the x or horizontal direction of the image dx and move some amount in the vertical or y direction dy. The markers 1402, 1404, 1406, etc., define unit motions in both the j and k direction exactly at the knee of the marker. In order to move a unit in the k direction, you will need to move a different amount in the x or horizontal direction of the image dx' and a different amount in the y or vertical direction of the image dy'.

These four values, dx, dy, dx', dy' are all defined precisely at each marker knee. They can be calculated using interpolation in the inner triangles of the Delaunay triangulation by looking at the values at each of the three vertices of the triangle. For instance, at a point inside of triangle 1504 in FIG. 15, the dx, dy, dx', and dy' values will depend on the values at the three vertices defined by markers 1402, 1404, and 1406. This is a simple interpolation.

For example, if you only consider dx, the dx value could be calculated in the following manner. Imagine a plane defined by 3 three-dimensional points (x1, y1, z1), (x2, y2, z2), and (x3, y3, z3). The x and y values of the three points could correspond to the coordinates of the marker center points in the image. The z value could be assigned to the dx value at each of those three points. An imaginary plane passes directly through those three points and in fact in a three dimensional space, any non-collinear three points define a plane. A plane is defined by an equation Ax+By+Cz+D=0. The equation of the plane can be calculated using the three points that make up that plane. After the equation is calculated, one can find the z value or in other words the dx value at any (x, y) point. Simply by plugging in the (x, y) point into the equation z=(−D−Ax−By)/C, the system 90 generates the interpolated dx value at that point.

The same technique can be used with dy, dx' and dy' in order to find the complete set of direction values at any point within a Delaunay triangle.

Unfortunately there are several points inside the region 1502 which are not completely surrounded by marker vertices. None of the edge vertices of the region have known dx, dy, dx', or dy' values. As in the earlier example, these must be extrapolated. One extrapolation technique is to imagine a line originating at the non-marker vertex and extending to the centroid of the region. The imaginary line will cross from the triangle containing the non-marker vertex to another triangle that is fully defined by markers. One embodiment of this invention moves the "z" value of the non-marker vertex to be in the same plane as the neighboring triangle that is fully defined. In other words, the fully defined plane is extended out to a non-fully defined triangle and the vertices of that triangle are moved to be in the plane of the other triangle. While this does not guarantee to create a piecewise continuous derivative, it has been found to be an effective compromise to not having all of the information for the entire region and is analogous to extrapolating a two dimensional line.

Once all of the triangles have been completely defined, it is possible to ask for the dx, dy, dx', and dy' values for any location on the region 1502. These values can then be used directly, using either Euler's method or a Runge-Kutta method or any other well-understood method to create the grid.

In block 608, the constant spacing grid 1602 is created by the system 90 in the following manner. Select any point within the driveway boundary 1202. Calculate two new points on either side of the selected point, each one unit away along the j direction. The new points can be determined using the dx and dy values calculated at that point if using Euler's method or using an average of the dx and dy values at the original point, at a point approximately halfway of the new point's location, if using a Runge-Kutta method. Now calculate the new points on either side of the original point along the k direction using dx' and dy' in the same way they were used to calculate the j direction points. You now have 5 points—one in the center that was selected arbitrarily and four new surrounding points. You can continue to build the grid 1602 by calculating the surrounding points of the four new points and working out from the initial point. By preserving the connectivity information or in other words by keeping track of which point was calculated from which other point and along which direction, the grid 1602 is completed.

The extension of the grid 1602 halts when the region 1502 is full of grid points. The grid 1602 is no longer extended in a given direction when one of a few criteria is met. One stopping point is when a grid square is calculated where all the points lie outside the driveway boundary 1202. Another stopping point is when a point is calculated that lies outside the Delaunay triangulation region 1502. Finally, if the driveway grid 1602 begins to double back on itself, it is no longer necessary to extend the grid 1602.

The grid 1602 doubles back on itself when the surface slope is changing in such a way that the dx and dy or dx' and dy' values reverse direction. This corresponds to the physical situation where the driveway surface is tangent to the line of sight of the image. In other words, at the point where a mathematical normal vector to the three dimensional surface of the driveway is exactly perpendicular to the line of sight from the camera and the driveway then begins to descend out of sight of the viewer, the grid lines will double back on themselves. It is appropriate that the grid 1602 continues in the opposite direction since this is what is happening to the driveway physically, but since it is impossible to see the other side of the driveway you no longer have to extend the grid 1602 in that direction.

FIG. 16 shows the completed grid 1602 with all of the grid points connected and with the grid trimmed by the boundary 1202 of the driveway.

Figure 17:
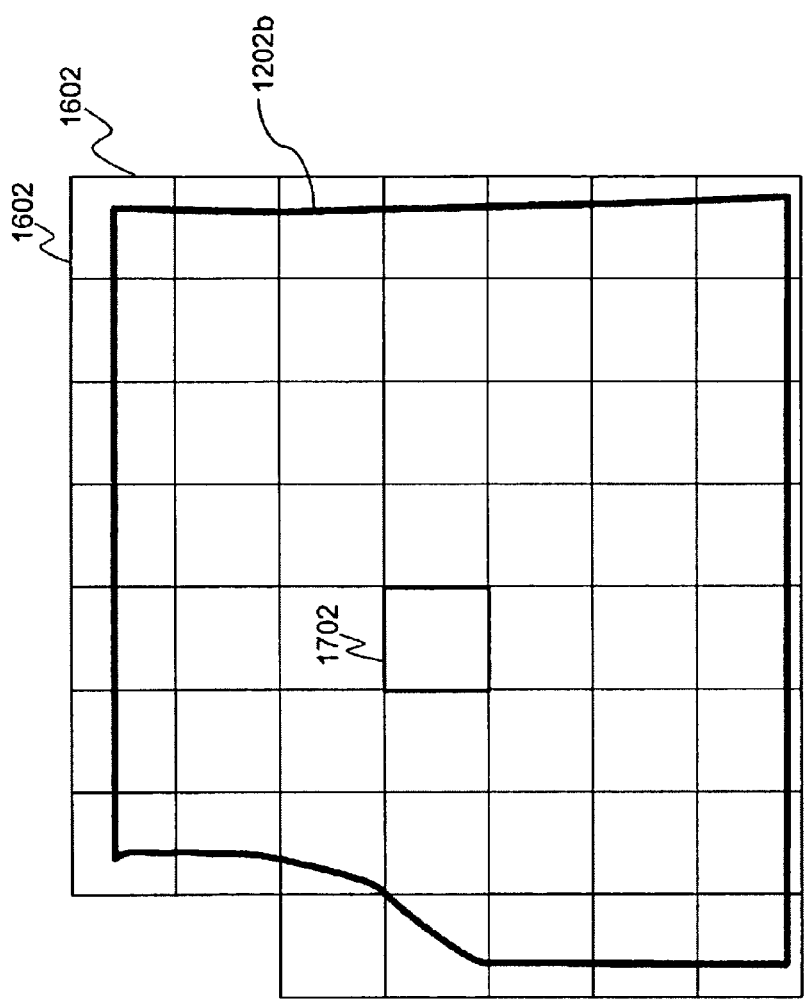
FIG. 17 is a diagrammatic representation of the driveway after it has been transformed onto a flat plane or a "plan view".

Block 610 in FIG. 6 is performed where the perspective transformation matrices and their inverses are calculated. FIG. 17 shows the uniform grid 1602 displayed in a view where the grid elements or sections 1702 are square and the grid lines equidistant. Each grid element 1702 (square) in the flat view corresponds to a grid polygon calculated on top of the digital image of the driveway.

Once a grid element or square 1702 correspondence is calculated between the image view in FIG. 16 and the flat view in FIG. 17, it is possible to calculate a perspective transformation that converts between points shown in the flat view and points shown in the image view. FIG. 18 shows a representation of that transformation. The transformation can be stored as a 3×3 matrix and the matrix's inverse can be calculated for making the transformation back in the other direction. Once the perspective matrix is known as well as its inverse, it is possible to convert from one view to another. For instance, if line segment 1808 is displayed in the image view, the inverse of the perspective transformation matrix can be used to transform the endpoints of line segment 1808 to the correct position in the uniform grid element of the flat view 1802. The endpoints correspond to line segment 1806 in the flat view. The combination of all of the perspective transformations and their inverses can be used to convert any vertex, line or polygon in one view into its corresponding shape in the other view. This fact is used to convert the driveway boundary 1202 into the flat view so that the borders can be calculated correctly.

The mathematical calculations required to generate the perspective transformation matrix and the inverse are well known in the art. One can use a number of software libraries available for calculating the perspective transform matrix, including the Java Advanced Imaging library or JAI library from Sun Microsystems of Palo Alto Calif. which provides two methods or subroutines called PerspectiveTransform.getSquareToQuad( ) and PerspectiveTransform.getQuadToSquare( ) for calculating the perspective transformation and its inverse. The PerspectiveTransform Java class is part of the javax.media.jai package and the documentation for this package is available on the Internet.

The perspective transform matrices and their inverses are preferably stored in a structure that allows this invention to figure out which matrix to use to transform any given line segment or vertex. In general, the perspective matrices for each grid element 1702 are unique and transforming a vertex located in one grid element 1702 using the transformation matrix from another grid element 1702 will place the transformed vertex in the wrong place in the other view. This is why the vertices and line segments must be classified by grid element and transformed by the correct perspective matrix.

An important observation about this type of transformation is that a straight line that crosses grid elements in either the grid or the flat view will not necessarily be straight in the other view. This method of transforming lines and vertices must be done one grid element at a time. If a line crosses grid boundaries in either view, that line must be divided up into line segments that do not cross grid boundaries and then transformed on a grid-by-grid basis. This works because vertices that lie on the edge of a grid element 1702 can be transformed by either transformation matrix and arrive at the same location on the other view. This is a result of the way the matrices are calculated.

If a line segment crosses a single grid element boundary, that line segment is divided into two line segments and the correct transformation matrix transforms each segment. Even though the resulting line segments will not usually form a straight line in the other view, the line will be continuous because the vertices, which landed on the grid element boundary, will also be on top of each other in the other view.

Figure 7:
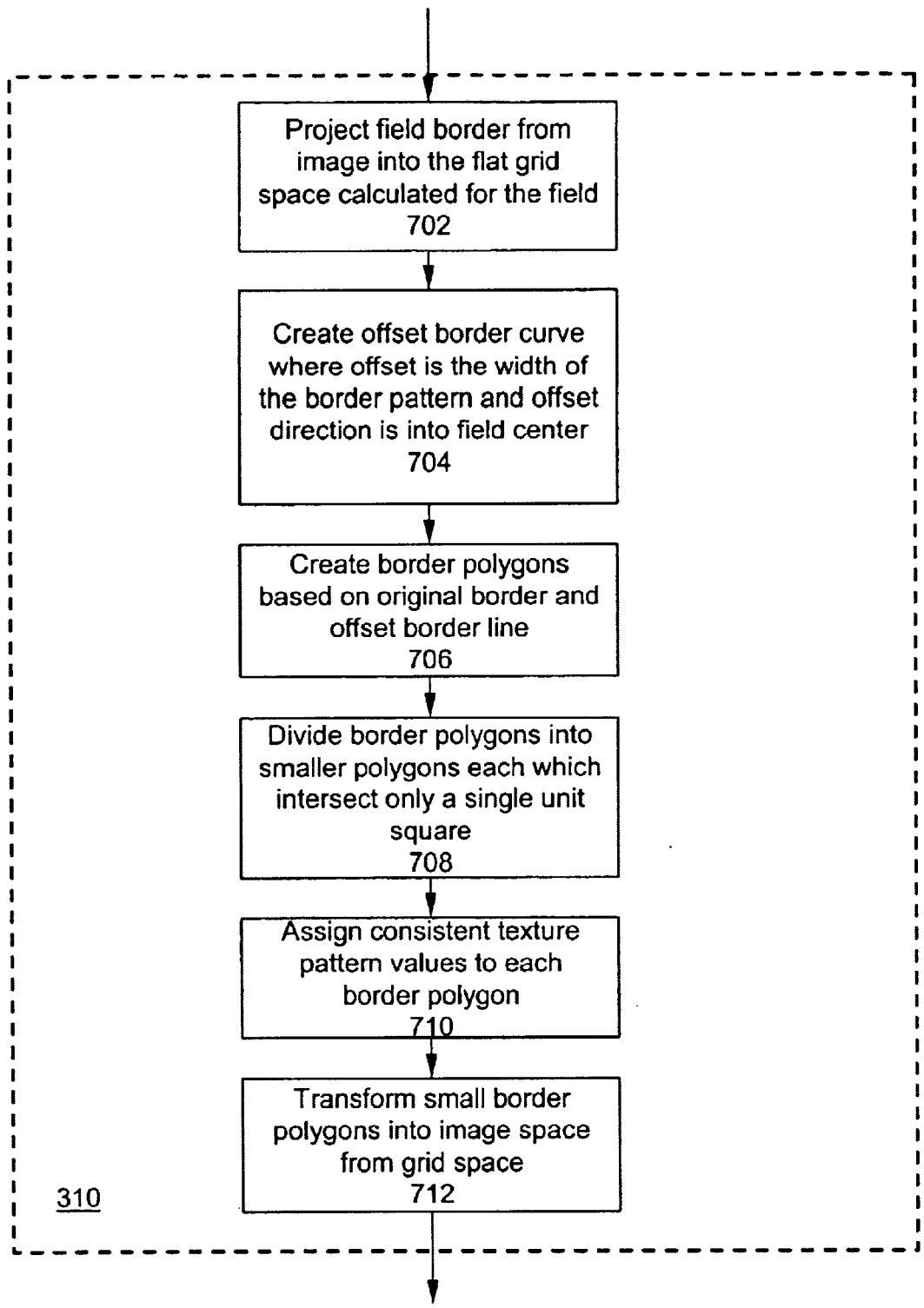
FIG. 7 is a flow chart of the method for calculating the border.
Figure 9:
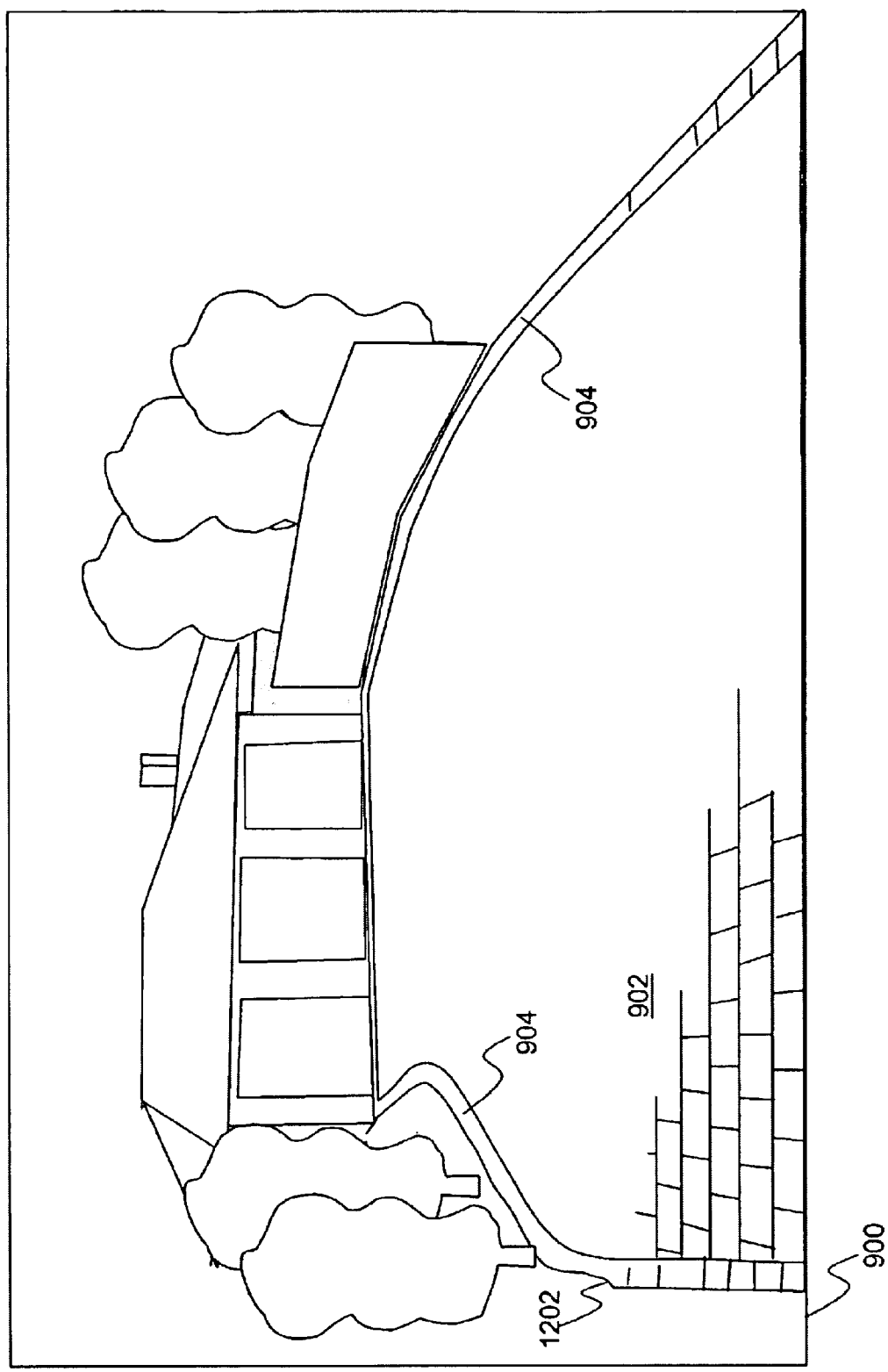
FIG. 9 is a diagrammatic illustration of a completed driveway simulation (image) where the original driveway surface has been replaced by a simulated paving stone surface.
Figure 24A:
FIG. 24A is an example image of a driveway during the simulation process but before the new surface has been simulated and drawn on top of the old surface.

FIG. 7 shows the details of the border calculation block 310. As shown in the schematic of the completed driveway in FIG. 9, typically there is a special border 904 of paving stones laid around portions of the edge or boundary 1202 of the driveway. In FIG. 9, only a portion of the simulated image is shown in the area 902 of the field. FIG. 9 is a schematic diagram of the simulated image of FIG. 24A and 24B. This border 904 preferably has a constant width around the relevant portions of the boundary 1202 of the driveway because it is made of rectangular stones laid side by side around the border 1602.

Block 702 in FIG. 7 shows the first step of the method, which is to project the driveway boundary 1202 from the image view into the flat view shown in FIG. 17. The border layout unit 208 preferably does these calculations. The transformation matrices used for this projection were calculated in block 610, and are stored in memory 203. In order to transform the driveway boundary 1202, it is necessary divide the boundary 1202 into individual line segments, each of which is completely contained within a single grid element 1702 in the original digital image. The line segments are still kept in order so as to form the driveway boundary 1202. Each segment is transformed by the inverse perspective transformation matrix of the grid element 1702 containing that segment. This converts driveway boundary 1202a shown in FIG. 16 to boundary 1202b shown in FIG. 17. The flat view corresponds somewhat to an overhead or plan view of the driveway. This flat view can be used to calculate a border of constant width for the driveway boundary. As those skilled in the art will recognize, it would be very difficult, if not impossible to calculate the constant width border in the perspective view or image view where the border is not a constant width even within a single grid element.

Figure 19:
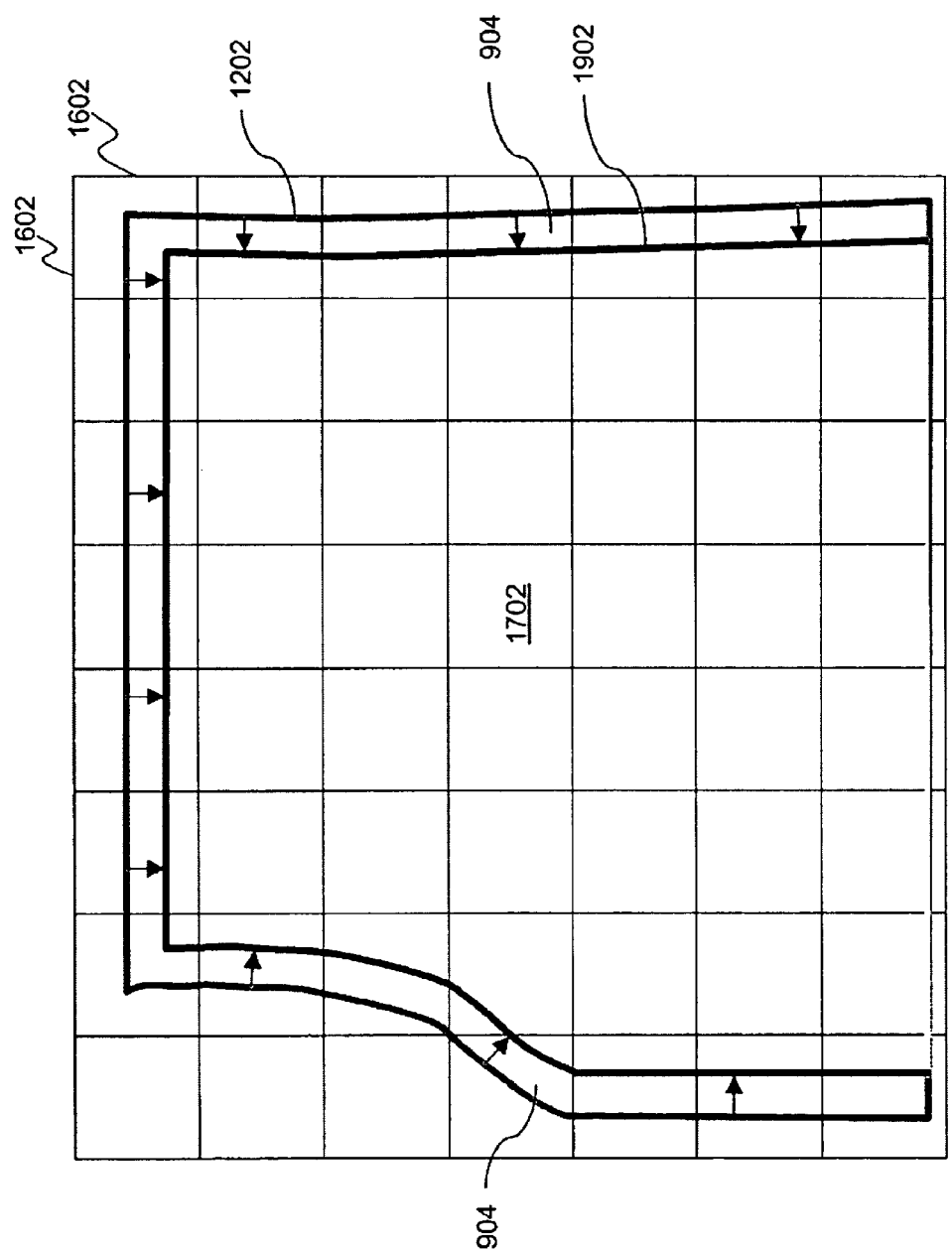
FIG. 19 is a diagrammatic illustration showing the border area in the plan view of the driveway surface.

FIG. 19 shows the calculated offset line or curve 1902 that corresponds to one side of the border 904 paving stones and generated in block 704. The original boundary line 1202 selected in block 306 and transformed into the flat view of FIG. 19 is offset towards the inside of the surface to be simulated. The offset amount is based on the dimensions of the stones the form the border 904 of the driveway.

The calculation of offset curve 1902 is well known in the industry and is explained in many computer graphics texts. Calculating the shape of a polygon that is just an offset from another polygon is straightforward.

The basic algorithm for calculating the offset shape from an initial polygon 1202 requires calculating the normal of each line segment making up the polygon 1202. A new line segment is created which is displaced from the original line segment by the offset distance. The new line segment is parallel to the original line segment and in the direction of the interior of the polygon 1202. Each of these new line segments will have to be trimmed if the angle between the original line segment and its neighbor is less than 180 degrees or extended if the angle is greater than 180 degrees. These techniques for generating offset curves are known in the computational geometry field such as that disclosed by B. Pham in 'Offset curves and surfaces: a brief survey,' *Computer-Aided Design* 24(4), pp. 223–229 (1992). Block 704 can be completed using any appropriate algorithm for generating the offset curve.

It should be understood that not every boundary line 1202 has a corresponding a border line 1902. For example, at the bottom part of the driveway boundary line 1202 in FIG. 12 is along the edge of the digital image. Boundary lines 120 that are along the image are usually not border lines because they cut through the field of the driveway instead of being along the boundary of the driveway. Boundary lines 1202 that are not border lines are not offset into the driveway. As a border line approaches a non-border boundary line, instead of being trimmed by another offset line, it is trimmed by the non-border boundary line.

Figure 20:
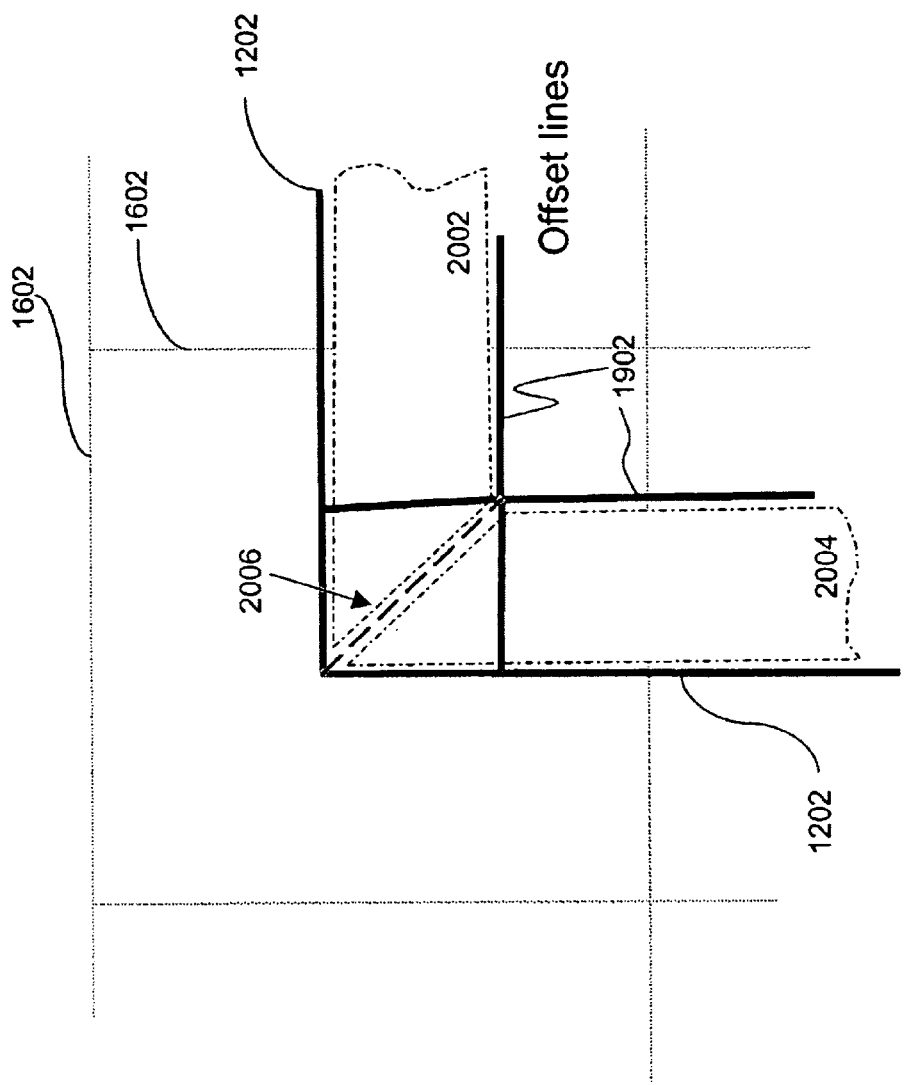
FIG. 20 is a detailed illustration of one corner of the border area of the simulated driveway surface.

Block 706 is the step where the polygons 2002, 2004 representing the border 904 are created. These polygons 2002, 2004 exist between the original boundary lines 1202 and the offset lines 1902. FIG. 20 shows parts of two example polygons. The polygons 2002 and 2004 are created based on the original boundary line 1202 transformed into the flat view of FIG. 19, the new offset line 1902, and a line 2006 bisecting the angle between two line segments of the boundary line 1202. In other words, each line segment in the transformed boundary line 1202 will have a corresponding polygon which is bounded by the corresponding offset line segment 1902 and the two bisecting angle lines on either side of the line segment.

Figure 21:
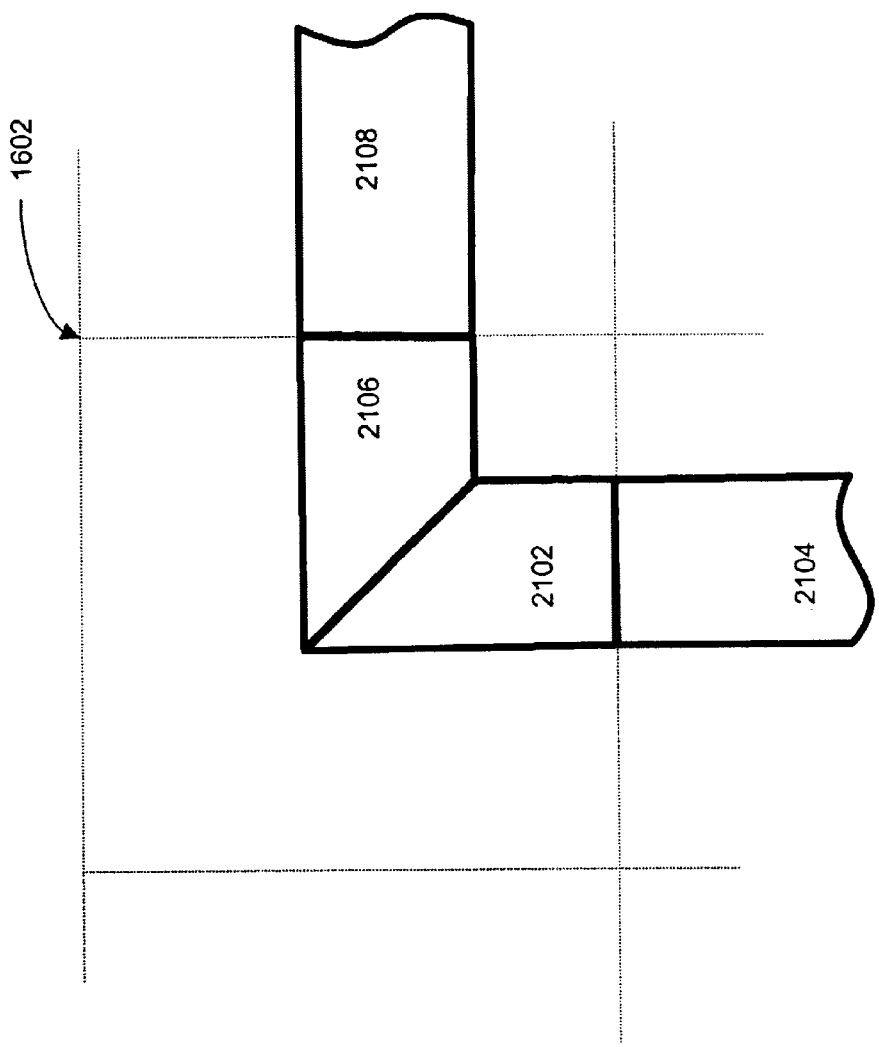
FIG. 21 is a diagrammatic representation showing the border polygons divided up so that they fit into the grid elements.

In order to transform these polygons 2002, 2004 back into the image view from the flat view, each polygon 2002, 2004 will need to be divided so that no polygon overlaps a grid boundary line. Block 708 of FIG. 7 represents this step in the process and FIG. 21 shows polygons 2102 and 2104 that are created from polygon 2004 by dividing along the grid line 1602. This is a simple mathematical operation well understood in the art that involves classifying the vertices that make up the polygon 2004 into grid elements 1702 to locate all polygon edges that intersect grid element edges. Then the intersection point is calculated and new polygons 2101, 2104, 2106 and 2108 are created by dividing the original polygons 2002, 2004 at the intersection points. FIG. 20 and 21 make the steps clear visually and anyone with experience in computational geometry will understand that there are several algorithms for splitting polygons along the lines 1602. The Graphics Gems series of books is a good source for such algorithms.

Block 710 represents the calculation of texture coordinates for the polygons that will allow the border polygons 2101, 2104, 2106 and 2108 to be drawn accurately. Texture mapping coordinates are well known in the art for drawing simulated objects. Each object in a scene has a certain appearance due to the color and texture of the object and independent of the lighting in the scene or the location of the object. Texture on an object can be thought of as a decal or painting which contains the object surface colors which are independent of the shape of the object. Without texture maps, it would be necessary to define the geometry and color of an object at every point on the object, but using textures, you can define a relatively simple geometry and then map the texture to the geometry. For example, a piece of paper can be represented as a single rectangular polygon. If polygons only had colors and no "texture", then the sheet of paper would appear as a single solid color. If you wanted to place a "mark" on the piece of paper and had to assign a single color to each polygon, then you would have to divide up the paper which used to be a single polygon into a number of different polygons, some the color of the mark and some the color of the paper. For a piece of paper covered in writing, the number of polygons needed would be in the tens of thousands or perhaps even millions. A common technique used in computer graphics is to continue representing the paper as a single polygon but paint a "texture" on the polygons surface that has the writing on it. This allows the complexity of the paper model or number of polygons to remain small while still giving the appearance of detail. Every modern graphics card uses texture maps to display detail in this manner.

In the case of drawing paving stones, there exists an image which has the appearance of paving stones which can be stitched together edge to edge to give the appearance of repeating stones. A library of such images are preferably stored in the memory 203 of the system 90 for used with the methods describe herein. The field stone image 2302 and border stone image 2304 are shown schematically in FIGS. 23A and 23B, respectively. Realistic images that represent the field and border stones are preferably used in the simulation to make a driveway or other surface to appear to be paved with the stones represented in the images.

Texture coordinates are calculated for every vertex in each border polygon 2002, 2004. The coordinates are calculated as if the texture was projected at the correct size down on a chosen polygon that shall be called the first polygon. The texture coordinates u and v represent the directions in which the texture can be applied. One vertex which is on the driveway boundary line 1202 is chosen and is given a coordinate of (u, v)=(0, 0). The u texture coordinate varies along the driveway boundary line 1202 and the v coordinate varies in the direction of the normal to the boundary 1202. All vertices will have v=0 or v=1 depending on whether they are on the boundary line 1202 or the interior offset line 1902 respectively. This tells the graphics hardware that the entire texture will fill the area between the boundary and offset lines without repeating.

Along the u direction on the boundary line 1202, the u coordinate will be set based on the curvilinear distance along the line. The first vertex will be at u=0, and at the end of that line segment with length I1, the next vertex will be at u=I1. At the next vertex, which is on the other side of a line segment with length I2, the vertex will be (I1+I2, 0) and so on. This can be visualized as unbending the line segments and forming a straight line and giving each vertex in the line a u texture coordinate based on its distance from the first point. This texture coordinate assignment technique guarantees that the texture map will be repeated appropriately along the border. The u value of vertices on the interior offset line 1902 will be calculated by projecting them back in the direction of the normal to the boundary line 1202 and use the corresponding u value of the projected point on the boundary line 1202. This calculation prevents the texture from being distorted in the flat view. At the completion of block 710, every border polygon 2002, 2004 should have texture coordinates corresponding to each vertex.

Block 712 represents the transformation of the border polygons with texture coordinates back into the image view using the perspective transformation matrices calculated in block 610. Each vertex of each polygon is transformed using the matrix of the grid element in which it is contained. Texture coordinates are preserved and not transformed. The completion of this block gives a list of polygons in image space which, when rendered using the textures and texture coordinates, realistically appear as the new border of a paved driveway.

Figure 23B:
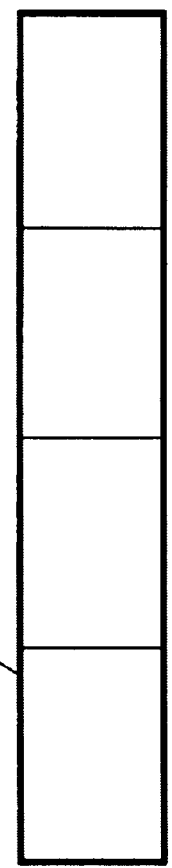
FIGS. 23A and 23B are diagrammatic representations of the images or "textures" which are tiled to simulate a new paving surface for a driveway.
Figure 23A:
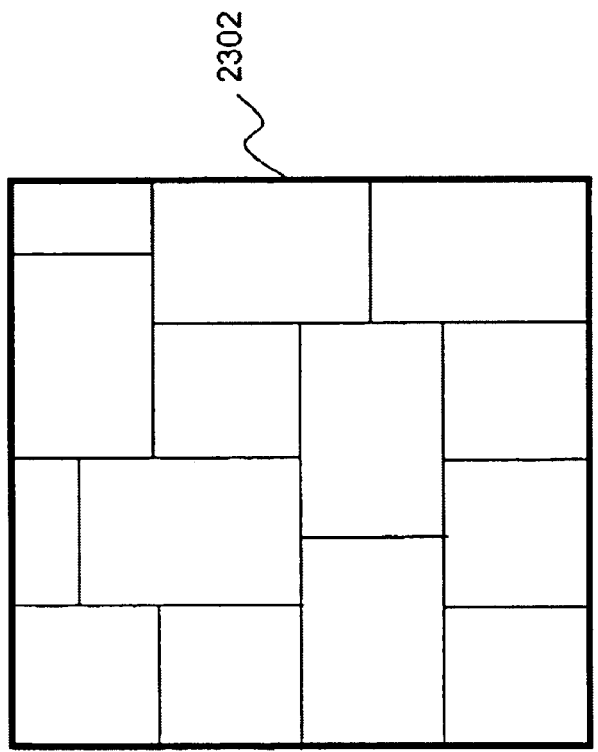

Once the boundary 1202 and markers 110 are located and the border 904 is calculated, the user, in block 312, can now select a paving stone style and color for both the field or interior of the new driveway as well as the border 904 of the driveway. FIGS. 23A and 23B show a diagrammatic representation of some example border and paving stones. In practice, several different realistic images are presented to the user of the invention and the user is able to choose a style and color for both the field of the simulated area and the border 904.

The field and border images are special in that if the field image is drawn in a repeating pattern where the right edge is up against the left edge of the image and the top and bottom or together, it is impossible to tell where the edges are. This is common practice in constructing texture maps for simulated scenes and is well known in the art. The border 904 must be repeatable when the short edges of the rectangle are connected, but not the long edges because the border 904 is never repeated in that direction.

Figure 24B:
FIG. 24B is an example image of a driveway after the simulation process where the new surface has been simulated and drawn on top of the old surface.

Using the images of the newly selected paving stone, block 314 indicates that the computer 112 now processes the information and the image generation unit 209 calculates a new simulated image to draw over the original surface and displays it on the display device 104. An example of such a new image with a simulate surface is shown in FIG. 24B.

Typically, an image buffer in memory 203 is created by the image generation unit 209 and the digital image is drawn into that buffer. Then the field is drawn. Each grid element is drawn as a separate polygon with texture coordinates at each grid intersection calculated so that the texture map repeats itself seamlessly and appears to be paving stones. Polygons for the entire grid are drawn, even though the grid extends beyond the edges of the driveway boundary. When the new field image is composited on top of the original driveway image, it is clipped to the boundary so that it doesn't ever overwrite areas outside the selected driveway boundary. Next, the image view border polygons are drawn on top of the field. Since the polygons do not extend beyond the boundary 1202, no areas of the image outside the simulation are affected. At this point, the simulation is complete and the image buffer is displayed on the computer display device 104.

Figure 4:
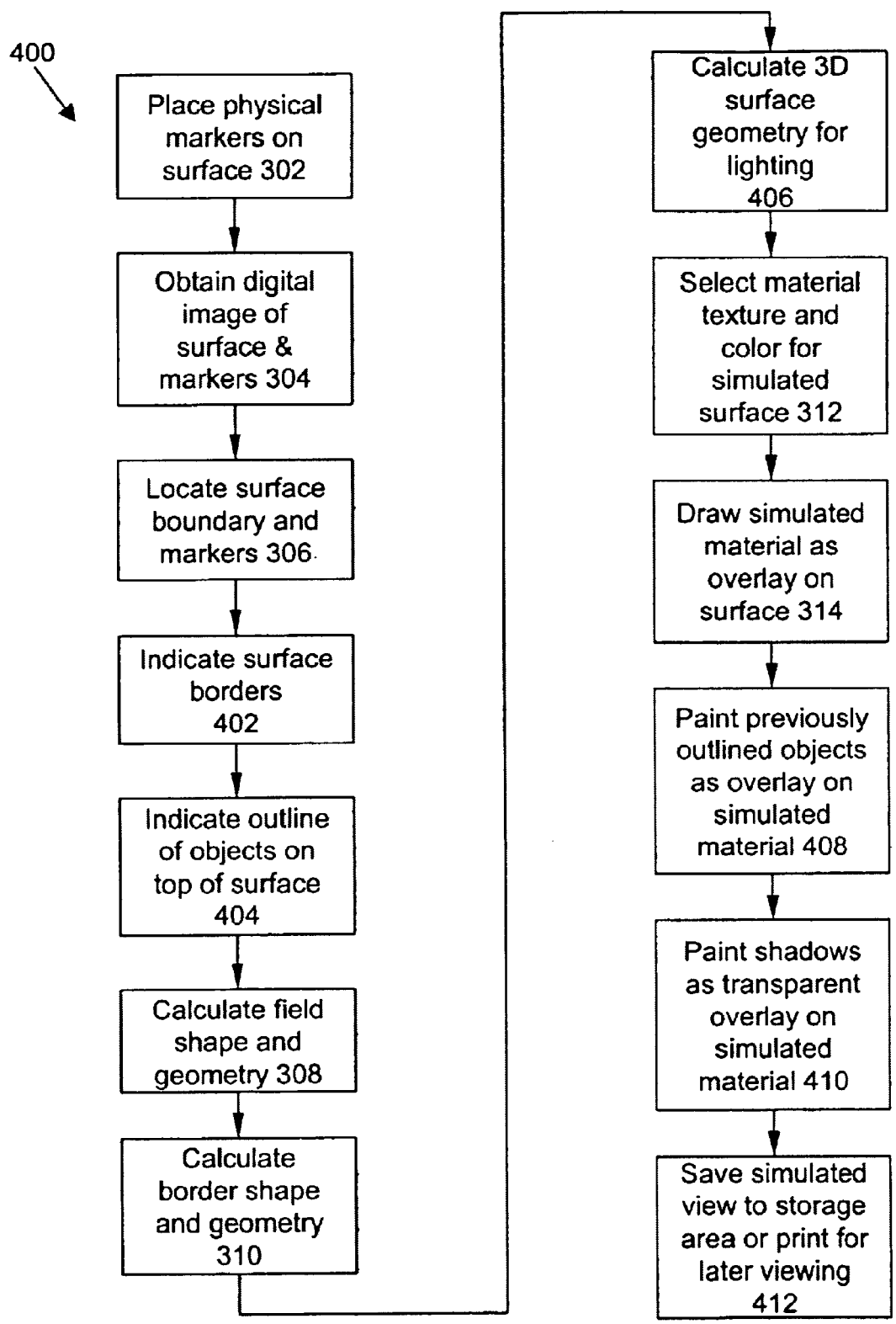
FIG. 4 is a more detailed flow chart of the steps for advanced surface replacement, including repainting shadows and repainting objects on top of the surface.
Figure 13:
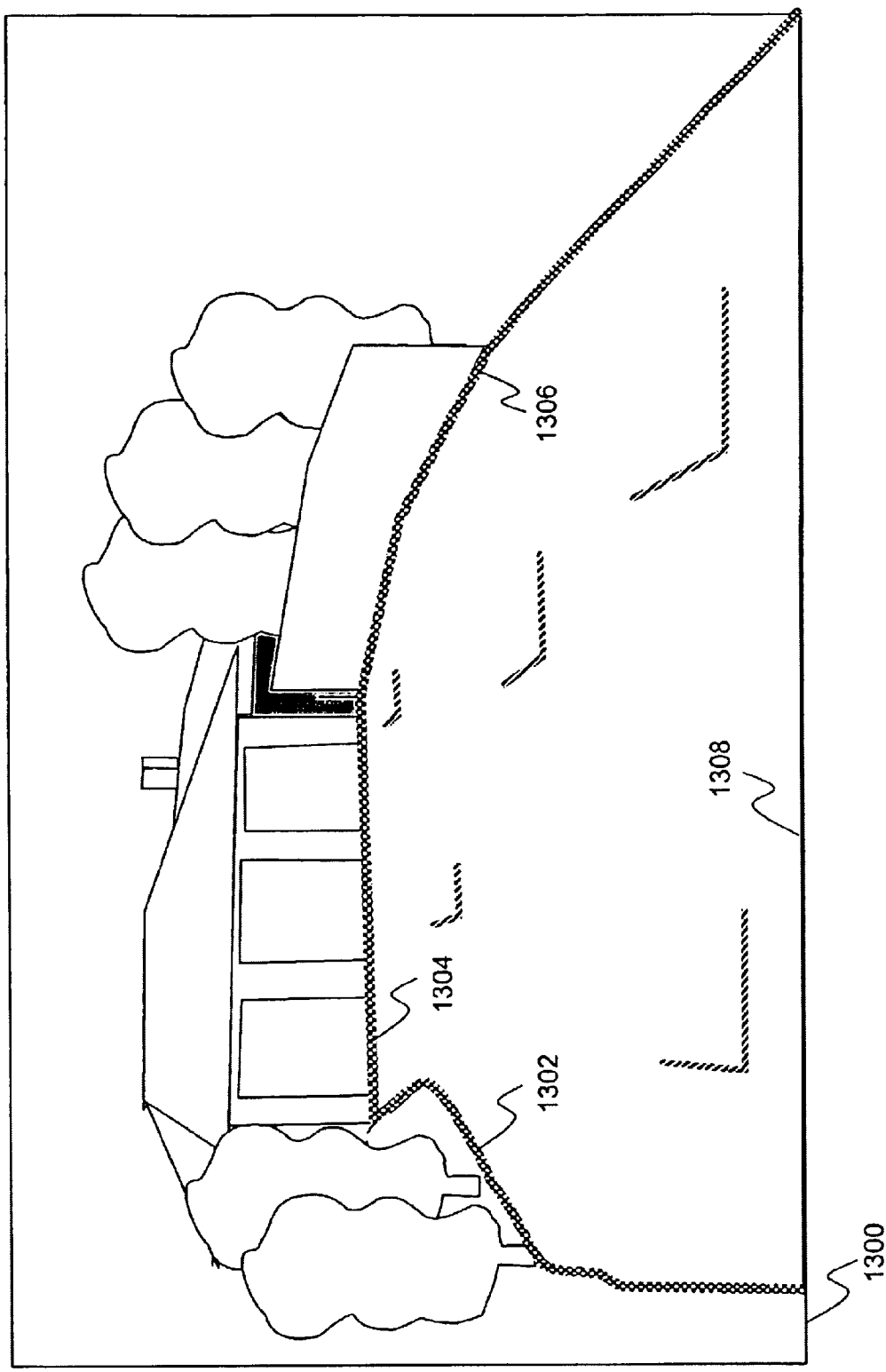
FIG. 13 is a diagrammatic representation of a driveway image after the driveway boundary has been indicated and after the parts of the boundary that will make up the paving borders have been selected.

FIG. 3 shows blocks 302–314 are the most basic steps required for this invention. FIG. 4 indicates additional steps that enhance the simulation. For convenience and ease of understanding the step that are the same as those of FIG. 3 have been similarly numbered and labeled, and have identical functionality. In addition to the blocks that were shown in FIG. 3, block 402 is added where the user indicates to the system 90 which of the boundary lines 1202 are also border lines 1902. Border lines 1902 indicate the location of a special row of border stones on the surface and are selected from the boundary lines 1202 by the user of the invention. As previously described, without block 402, the system 90 renders all of the boundary lines 1202 as borders 904 with special border trim except those that coincide with the boundaries of the image itself which are rarely borders. With block 402, the user can indicate that some additional boundary line segments 1202 do not represent border lines 1902 and therefore no border polygons should be generated for those. As best shown in image 1300 shown in FIG. 13, the boundary 1202 includes curve and line segments 1302, 1304, 1306 and 1308. In comparison, border lines 1902 include only curve segments 1302, 1304, and 1306; and not line segment 1308. Line segment 1308 is not included because it is not coincident with the driveway border but crosses the field of the driveway.

Block 404 is an optional block in which the user of the invention can indicate which objects in the original scene are on top of the physical driveway and obscure a portion of the view of the driveway. If the user of the invention selects or traces around the object seen on top of the surface to be simulated, that object can be copied and pasted back on top of the final simulation, adding substantially to the realism of the simulated paving stone. The outlines of the objects can be drawn or selected using the same user interface and techniques as outlined for selecting the driveway boundary 1202 in block 306.

In conjunction with block 404, in block 408 the image generation unit 209 paints the preserved objects back on top of the simulated surface after the simulated surface has been completely rendered. This gives the appearance that those objects were in front of the surface.

Just drawing the paving stone images without considering the scene lighting will produce a simulation with constant brightness across the visible field of the driveway. In reality, the brightness of the driveway depends on the geometry of the surface and how the light of the sun reflects on that surface.

Block 406 indicates an optional calculation done by the apparatus of the invention where the surface normals are calculated for the geometry. Surface normals are used in lighting calculations to determine intensity of simulated light due to specular reflection of a light source that in this case is typically a simulated sun. Only the direction of the normal is calculated and used.

Surface normals in three dimensions are generally calculated from a fully described geometry where each vertex is defined in three dimensions. So far, we have only calculated vertices using two dimensions in the image view and in a plan view that assumes a constant third dimension and therefore is effectively a two-dimensional view. In order to calculate the normals, we need at least an estimate of all three vertex coordinate values.

Figure 22:
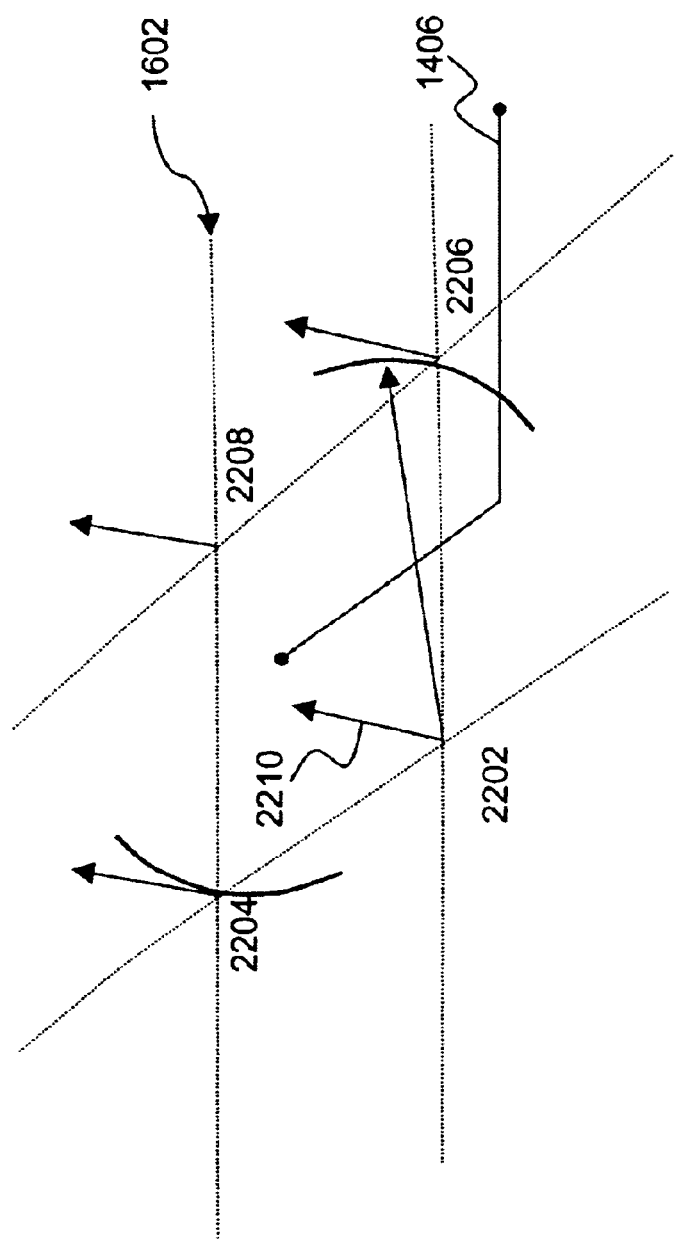
FIG. 22 is a partial illustration of the geometry used to calculate the surface normals of the simulated surface using the grid points on the image.

FIG. 22 shows a schematic representation of a small part of the entire grid 1602 and a marker 1406. Also indicated are four of the grid intersections 2202, 2204, 2206 and 2208. Each of the intersection points 2202, 2204, 2206 and 2208 has a normal arrow representing the direction of the surface normal. Normal 2210 corresponds to intersection 2202.

Figure 8:
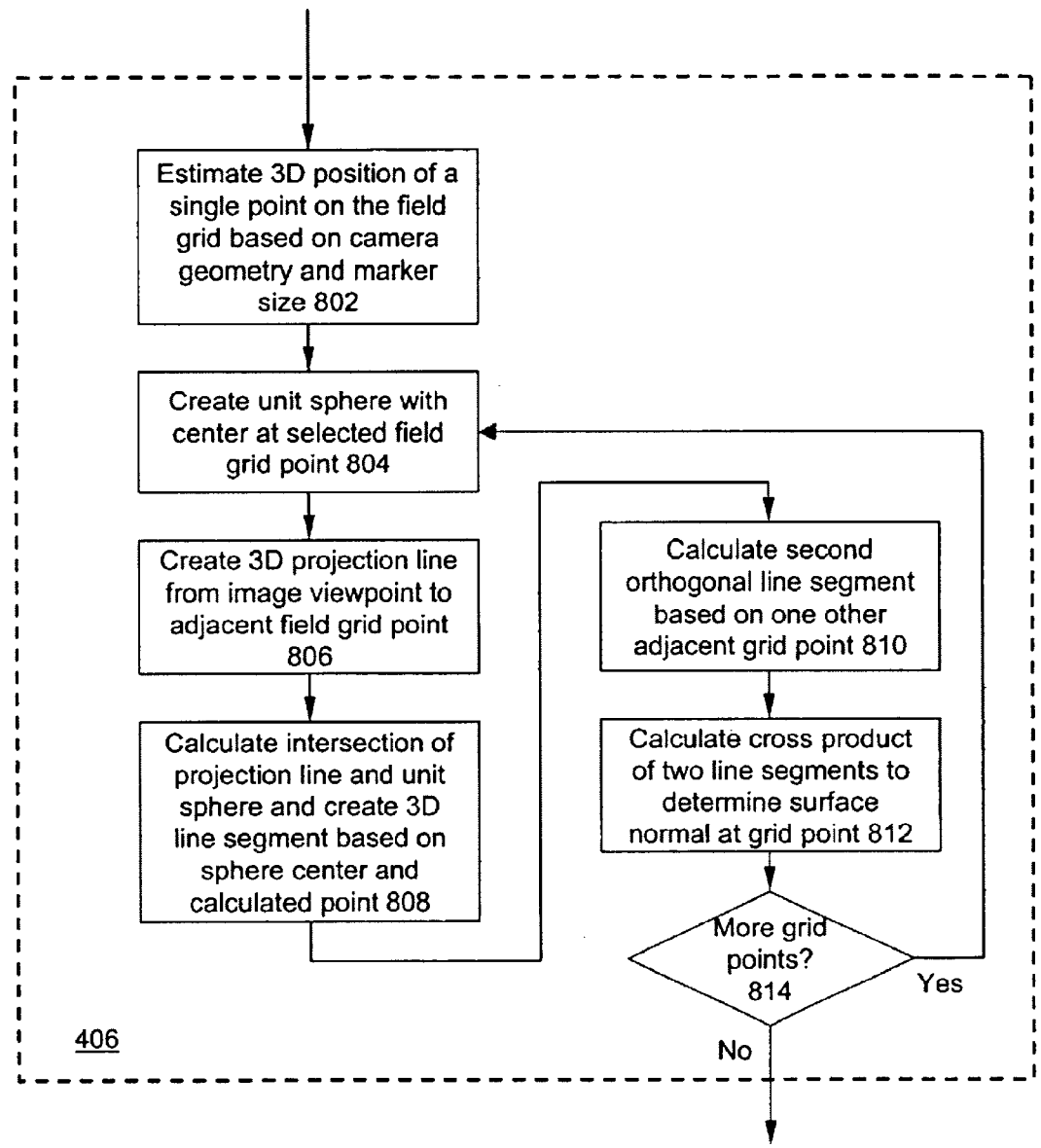
FIG. 8 is a flow chart of the method for calculating the 3D geometry.

Enough information is known about the grid 1602 to allow the calculation of the normal direction and the calculation proceeds as detailed in FIG. 8. First, in block 802, a single vertex or grid intersection point in the image is selected. Let the position of that vertex be (0, 0, 0) in three dimensions. It doesn't matter what the actual value is because the normal is not based on the specific position of the surface, but only on the orientation of the surface. In fact, one only needs three non-collinear vertices on a plane in order to calculate the normal of that plane. The present invention calculates the normal at each grid intersection point by finding the relative positions of neighboring intersection points, creating orthogonal vectors based on those points, and then calculating the cross product of those vectors to get the direction of the normal.

In block 804, a sphere that has its origin at the chosen vertex perhaps vertex 2202 is determined. If the sphere is given the same radius as the grid spacing, we know that the surface of the sphere touches the vertices 2204 and 2206 as shown in FIG. 22. Considering the geometry of the scene including the camera 100 which captured the original image, the image was captured from a single viewpoint, and it is convenient to imagine the camera 100 at a point in space looking towards the scene to be simulated. Even though the scene is three dimensional, when it is captured, it is as if the scene is flattened onto a canvas placed in front of the camera 100. For each pixel in the image on that canvas, one can imagine a ray emanating from the camera lens through canvas and to the scene. The color of the pixel on that canvas depends on where the ray intersects an object in the real scene.

In block 806, a camera position is selected at some distance in front of the chosen vertex and centered on the center of the image. One ray emanates from the camera lens to the chosen vertex 2202. Another ray emanates from the camera lens to vertex 2204 and yet another ray leaves the lens and intersects vertex 2206. Each ray intersects the imagined sphere in either 1 or 2 points.

Now, in blocks 808 and 810, the intersection of a sphere with the rays emanating from the camera location is calculated. It is trivial to calculate the intersection of the sphere with the two rays using known mathematical algorithms, at least one of which is described in the *Graphics Gems* series. If an intersection calculation returns a single 3 dimensional point, that point is used as the three-dimensional vertex for the normal calculation. If two points are returned—the most common case—we can select the one that is most likely the correct vertex. In the case illustrated in FIG. 22, the farthest intersection point from the camera 100 will be the correct vertex because it passes through the sphere. Using this technique, vertices 2204 and 2206 can be calculated.

As shown in block 812, two vectors are now calculated (2204–2202) and (2206–2202). These vectors are used in a cross product to determine the surface normal. As shown in block 814, if there are more grid points whose surface normals are unknown, continue to calculate normals in this manner.

Eventually, all of the normal values at every grid intersection point 2202, 2204, 2206 and 2208 can be calculated. Using this information, normal values can be calculated at any point within the grid 1602 using interpolation. If desired, the three-dimensional values for each of the intersection points 2202, 2204, 2206 and 2208 can also be retained so that the visible parts of the field can be rendered in three dimensions.

For the final lighting calculation, every time a vertex is rendered, whether that vertex is part of the field 1002 or the border 904, a surface normal can be calculated and lighting calculations applied based on the location of the vertex in the grid 1602. Lighting calculations are well known in the art and details can be found in any programming documentation for three-dimensional simulations like the Java3D documentation from Sun Microsystems or the OpenGL documentation from the OpenGL consortium. A typical embodiment of this invention will specify the location of a lighting source, as well as an intensity and color and allow the software and hardware of the image generation unit to calculate the lighting effects based on the geometry of the simulated surface.

Block 408 uses the information input in block 404 to repaint the objects selected as being on top of the driveway. This is similar to a copied and paste operation in a drawing program where block 404 is the selection and the pixels within that selection are copied and then those same pixels are pasted in the same location in the image after drawing the simulated surface.

Block 410 is where the user of the system 90 is given a paintbrush-like tool similar to one found in Adobe's Photoshop where the user darken the image in specific areas by painting dark pixels on a semi-transparent layer of the image. This gives the effect of darkening the areas painted on the image and gives the appearance of shadows. Typically these shadows will be painted in the same area as the shadows on the original surface to add some realism since the simulated surface is not marked with the shadows on the original surface.

In the preferred embodiment, the shadows are painted onto an image buffer and then composited on top of the simulation before being shown on the display device 104. This keeps the shadow drawing separate from the simulated image and allows the shadows to be turned on and off and to be erased bit by bit without affecting the image.

Block 412 is a step where the newly simulated surface image can be saved as an image file of a standard format like JPEG to be viewed or printed later. Additionally, it is possible to save the driveway boundary, borders, marker geometry, selected paving stone and color to a descriptive file that can be reloaded to recreate the simulation without requiring any additional user input. This type of image and data saving is well known in the art and will not be described in detail.

Having now described a few embodiments of the invention, and some modifications and variations thereto, it should be apparent to those skilled in the art that the foregoing is merely illustrative and not limiting, having been presented by way of example only. Numerous modifications and embodiments are within the scope of one of ordinary skill in the art and are contemplated as falling within the scope of the invention as limited only by the appended claims and equivalents thereto.

What is claimed is:

1. A method for simulating a portion of a surface in an image, the method comprising the steps of:

placing at least one marker on the surface wherein the marker has a first side and a second side, the first side of the marker having a first color and the second side having a second color, so that the marker will have contrast with the surface depending on which side is visible;

capturing an image of the surface including the marker;
determining a boundary that defines a field for the portion of the image;
determining a location of the marker;
calculating the geometry for the field;
selecting a material and texture for a simulated surface; and
generating a new image comprising the captured image and the simulated surface in the field.

2. The method of claim 1, wherein the step of placing at least one marker on the surface includes placing a plurality of markers on the surface.

3. The method of claim 1, wherein the step of placing at least one marker on the surface includes placing at least three markers on the surface.

4. The method of claim 1, wherein the marker has a first member and a second member both of a predefined length and the first member has an orthogonal position relative to the second member.

5. The method of claim 1, wherein the marker has a color that contrasts with a color of the surface.

6. The method of claim 1, wherein the marker has an elliptical shape.

7. The method of claim 1, wherein the step of capturing an image of the surface includes capturing an image of the surface with a digital camera.

8. The method of claim 1, wherein the step of capturing an image of the surface includes obtaining a photograph of the surface and the marker, and scanning the photograph with a digital scanner.

9. The method of claim 1, wherein the step of determining the boundary includes receiving input from a user to identify a plurality of segments in the image of the surface.

10. The method of claim 1, wherein the step of determining the boundary includes using computer vision techniques to automatically identify a plurality of segments based on edges or texture changes in the image of the surface that comprise the boundary.

11. The method of claim 1, wherein the step of determining the location of the marker includes the step of receiving input from a user to identify a first end point, a second end point and a knee-point of the marker.

12. The method of claim 1, wherein the step of determining the location of the marker includes using computer vision techniques to automatically identify the marker in the image of the surface.

13. The method of claim 1, wherein the step of determining the boundary further comprises the step of receiving additional input modifying the location of the segments in the image of the surface that comprise the boundary and wherein the step of determining the location of the marker further comprises the step of receiving additional input modifying the position of the points that identify the marker.

14. The method of claim 1, further comprising the step of automatically determining portions of the boundary that comprise a border.

15. The method of claim 1, further comprising the step of receiving input indicating portions of the boundary that comprise a border.

16. The method of claim 15, further comprising the step of generating the shape and geometry for the border.

17. The method of claim 1, further comprising the steps of:
receiving input indicating an object on top of the surface; and
rendering the indicated objects as an overlay upon the simulated surface portion of the new image.

18. The method of claim 1, further comprising the step of calculating a three-dimensional surface geometry for lighting.

19. The method of claim 1, further comprising the steps of:
receiving input indicating a position for shadows on top of the surface; and
rendering shadows as a transparent overlay upon the simulated surface portion of the new image.

20. The method of claim 1, further comprising the step of storing the new image to an image buffer.

21. The method of claim 1, further comprising the step of storing the new image on a non-volatile storage medium.

22. A method for simulating a portion of a surface in an image, the method comprising the steps of:
placing at least one marker on the surface;
capturing an image of the surface including the marker;
determining a boundary that defines a field for the portion of the image;
determining a location of the marker;
calculating a geometry for the field by
creating a region that contains the boundary;
creating a Delaunay triangulation of the region using the marker as a vertex;
calculating derivatives of direction vectors for the field;
determining a spacing grid for the field from the derivatives of direction; and
calculating perspective and inverse transforms for the field and spacing grid
selecting a material and texture for a simulated surface; and
generating a new image comprising the captured image and the simulated surface in the field.

23. A method for simulating a portion of a surface in an image, the method comprising the steps of:
placing at least one marker on the surface;
capturing an image of the surface including the marker;
receiving input indicating portions of the boundary that comprise a border;
determining a boundary that defines a field for the portion of the image;
generating the shape and geometry for the border including
projecting the border from the image onto a spacing grid for the field;
creating an offset border curve offset a predetermined distance inward from the border;
creating at least one border polygon between the border and the offset border curve;
assigning a consistent texture value to each border polygon; and
transforming the border polygon into image space from grid space
determining a location of the marker;
calculating a geometry for the field;
selecting a material and texture for a simulated surface; and
generating a new image comprising the captured image and the simulated surface in the field.

24. The method of claim 23, wherein the step of generating the shape and geometry for the border further comprises the steps of:
dividing the border polygons into smaller polygons that are contained within a unit square of the spacing grid;

assigning a consistent texture value to each smaller polygon; and wherein the step of transforming the border polygon, transforms the smaller polygons to image space from grid space.

25. A method for simulating a portion of a surface in an image, the method comprising the steps of:

receiving input indicating an object on top of the surface;

placing at least one marker on the surface;

capturing an image of the surface including the marker;

determining a boundary that defines a field for the portion of the image;

determining a location of the marker;

calculating a geometry for the field;

selecting a material and texture for a simulated surface;

calculating a three-dimensional surface geometry for lighting by estimating a three-dimensional position of a point on a spacing grid based on a size of the marker;

creating a unit sphere having a center at a selected point on the spacing grid;

creating a three-dimensional projection line from an image viewpoint to an adjacent point on the spacing grid;

calculating an intersection of the projection line and the unit sphere to create a three-dimensional line segment;

calculating an orthogonal line segment based on another adjacent grid point; and determining a surface normal at the selected point from a cross product of the three-dimensional line segment and the orthogonal line segment generating a new image comprising the captured image and the simulated surface in the field; and rendering the indicated objects as an overlay upon the simulated surface portion of the new image.

26. The method of claim 25, further comprising the step of repeating the steps of claim 22 for an additional point on the spacing grid.

* * * * *